(12) United States Patent
DeMesa et al.

(10) Patent No.: US 7,698,292 B2
(45) Date of Patent: *Apr. 13, 2010

(54) TAG MANAGEMENT WITHIN A DECISION, SUPPORT, AND REPORTING ENVIRONMENT

(75) Inventors: Jesse G. DeMesa, Lake Forest, CA (US); Andrei V. Ougarov, Rancho Santa Margarita, CA (US)

(73) Assignee: Siemens Aktiengesellschaft, Munich (DE)

( * ) Notice: Subject to any disclaimer, the term of this patent is extended or adjusted under 35 U.S.C. 154(b) by 532 days.

This patent is subject to a terminal disclaimer.

(21) Appl. No.: 10/993,712

(22) Filed: Nov. 19, 2004

(65) Prior Publication Data

US 2005/0144154 A1 Jun. 30, 2005

Related U.S. Application Data

(60) Provisional application No. 60/526,891, filed on Dec. 3, 2003.

(51) Int. Cl.
G06F 17/30 (2006.01)

(52) U.S. Cl. .................................... 707/102
(58) Field of Classification Search .............. None
See application file for complete search history.

(56) References Cited

U.S. PATENT DOCUMENTS

| | | | |
|---|---|---|---|
| 5,825,361 A | 10/1998 | Rubin et al. | |
| 5,907,704 A | 5/1999 | Gudmundson et al. | |
| 5,982,362 A | 11/1999 | Crater et al. | |
| 6,003,036 A | 12/1999 | Martin | |
| 6,029,181 A | 2/2000 | Milakovich et al. | |
| 6,198,480 B1 | 3/2001 | Cotugno et al. | |
| 6,223,182 B1 | 4/2001 | Agarwal et al. | |
| 6,282,697 B1 | 8/2001 | Fables et al. | |
| 6,336,138 B1 * | 1/2002 | Caswell et al. | 709/223 |
| 6,381,605 B1 | 4/2002 | Kothuri et al. | |
| 6,430,565 B1 | 8/2002 | Berger et al. | |
| 6,477,434 B1 | 11/2002 | Wewalaarachchi et al. | |
| 6,480,836 B1 | 11/2002 | Colby et al. | |
| 6,505,205 B1 | 1/2003 | Kothuri et al. | |
| 6,505,247 B1 | 1/2003 | Steger et al. | |
| 6,609,123 B1 * | 8/2003 | Cazemier et al. | 707/4 |
| 6,643,555 B1 | 11/2003 | Eller et al. | |
| 6,643,691 B2 | 11/2003 | Austin | |
| 6,687,761 B1 | 2/2004 | Collins et al. | |
| 6,700,590 B1 | 3/2004 | DeMesa et al. | |
| 6,751,657 B1 | 6/2004 | Zothner | |
| 6,842,774 B1 | 1/2005 | Piccioni | |
| 6,952,705 B2 | 10/2005 | Knoblock et al. | |
| 6,996,566 B1 | 2/2006 | George et al. | |
| 7,069,514 B2 | 6/2006 | DeMesa et al. | |
| 7,133,865 B1 | 11/2006 | Pedersen et al. | |
| 2002/0099499 A1 | 7/2002 | Takayama et al. | |
| 2002/0169867 A1 | 11/2002 | Mann et al. | |

(Continued)

*Primary Examiner*—Don Wong
*Assistant Examiner*—Belinda Xue
(74) *Attorney, Agent, or Firm*—Buckley, Maschoff & Talwalkar LLC

(57) ABSTRACT

A system and methods for retrieving and presenting data in a tag-based component environment. The disclosed system provides an efficient mechanism for associating point and non-point data using highly configurable data acquisition strategies. The data acquisition strategies incorporate customized retrieval routines to perform data acquisition at desired intervals so as to reduce unnecessary bandwidth consumption and computational overhead.

44 Claims, 12 Drawing Sheets

U.S. PATENT DOCUMENTS

| | | |
|---|---|---|
| 2002/0184610 A1 | 12/2002 | Chong et al. |
| 2002/0198978 A1 | 12/2002 | Watkins |
| 2003/0055832 A1 | 3/2003 | Roccaforte |
| 2003/0058277 A1 | 3/2003 | Bowman-Amuah |
| 2003/0139968 A1 | 7/2003 | Ebert |
| 2004/0036716 A1 | 2/2004 | Jordahl |
| 2004/0059436 A1 | 3/2004 | Anderson et al. |
| 2004/0117393 A1 | 6/2004 | DeMesa et al. |
| 2004/0162834 A1 | 8/2004 | Aono et al. |
| 2004/0215626 A1 | 10/2004 | Colossi et al. |
| 2004/0220972 A1 | 11/2004 | Bhattacharjee et al. |
| 2004/0243281 A1 | 12/2004 | Fujita et al. |
| 2005/0021622 A1 | 1/2005 | Cullen |
| 2005/0044097 A1 | 2/2005 | Singson et al. |
| 2005/0065910 A1 | 3/2005 | Welton et al. |
| 2005/0071749 A1* | 3/2005 | Goerke et al. ............ 715/501.1 |
| 2005/0143969 A1 | 6/2005 | DeMesa et al. |
| 2005/0172306 A1* | 8/2005 | Agarwal et al. ............ 719/328 |
| 2005/0216555 A1 | 9/2005 | English et al. |
| 2005/0246627 A1 | 11/2005 | Sayed |
| 2005/0251571 A1 | 11/2005 | Karstens |
| 2006/0031250 A1 | 2/2006 | Henigman et al. |
| 2006/0067334 A1 | 3/2006 | Ougarov et al. |
| 2006/0116994 A1 | 6/2006 | Jonker et al. |
| 2006/0123019 A1 | 6/2006 | Nguyen et al. |
| 2006/0136583 A1 | 6/2006 | Helmstetter et al. |
| 2006/0161597 A1 | 7/2006 | Ougarov et al. |
| 2006/0200741 A1 | 9/2006 | DeMesa et al. |
| 2006/0218116 A1 | 9/2006 | O'Hearn et al. |
| 2006/0218131 A1 | 9/2006 | Brenes et al. |
| 2006/0294199 A1 | 12/2006 | Bertholf |
| 2007/0118599 A1 | 5/2007 | Castanho et al. |
| 2007/0124209 A1 | 5/2007 | Walker et al. |
| 2007/0208574 A1 | 9/2007 | Zheng et al. |
| 2007/0239741 A1 | 10/2007 | Jordahl |
| 2008/0103786 A1 | 5/2008 | Zhang et al. |

* cited by examiner

POINT DATA / NON-POINT DATA MAPPING TO TAG COLLECTION

410 482

| Table Column | Component Member |
|---|---|
| NAME | TagName |
| HLIMIT | hiLimit |
| LLIMIT | lowLimit |
| EUNIT | Units |
| DESC | Description |

FIGURE 4B

POINT DATA ACCESS / ASSOCIATION TO TAG COLLECTION  485

486 — Connection: "CurrentValue"
488 — Connection Group: PHD (Back-End Tag System)
490 — Tagname: "%TagName"
492 — Attribute: Value

FIGURE 4C

NON-POINT DATA / ATTRIBUTE TABLE (TAG_TABLE) 405

POINT DATA TABLE 406

455 460 465 470

| NAME | ID | VALUE |
|---|---|---|
| P100 | 1001 | 200 |
| P101 | 1002 | 80 |
| P102 | 1003 | 260 |
| C100 | 1004 | 5.3 |
| C101 | 1005 | ON |

410 415 420 425 430 435 440

| NAME | ID | HLIMIT | LLIMIT | EUNIT | DESC |
|---|---|---|---|---|---|
| P100 | 1001 | 300 | 100 | deg F | Pump operating temperature |
| P101 | 1002 | 200 | 0 | Pa | Pump pressure reading |
| P102 | 1003 | 1000 | 10 | rpm | Pump speed |
| C100 | 1004 | 10 | 0 | ft/s | Conveyor speed reading |
| C101 | 1005 | | | | Conveyor operating status (on, off, standby, fault) |

JOINED TABLE  494

| TagName | CurrentValue | hiLimit | lowLimit | Units | Description |
|---|---|---|---|---|---|
| P100 | 200 | 300 | 100 | deg F | Pump operating temperature |
| P101 | 80 | 200 | 0 | Pa | Pump pressure reading |
| P102 | 260 | 1000 | 10 | rpm | Pump speed |
| C100 | 5.3 | 10 | 0 | ft/s | Conveyor speed reading |
| C101 | ON | | | | Conveyor operating status (on, off, standby, fault) |

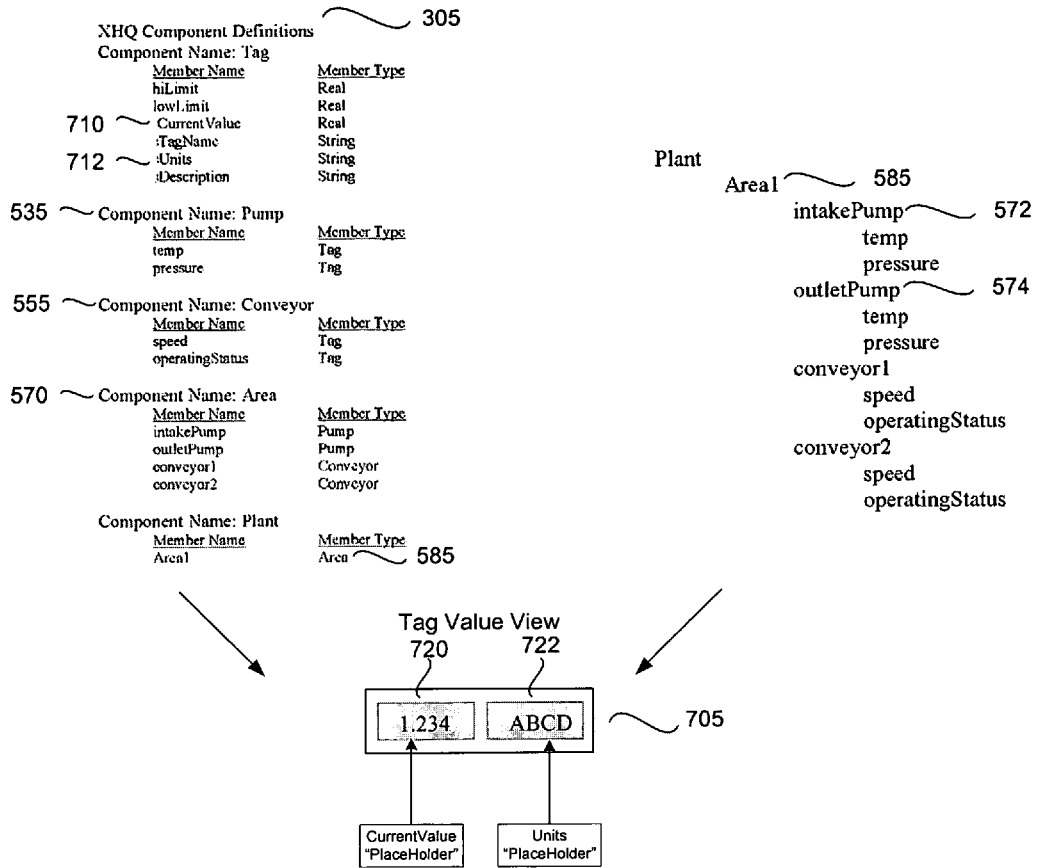
FIGURE 7A
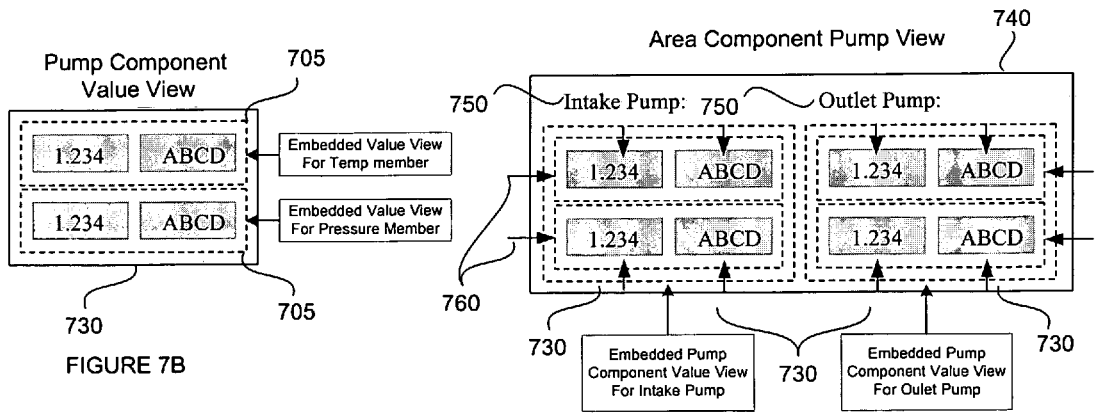
FIGURE 7B
FIGURE 7C

TAG MANAGEMENT WITHIN A DECISION, SUPPORT, AND REPORTING ENVIRONMENT

CROSS-REFERENCE TO RELATED APPLICATIONS

This application claims the benefit of priority from U.S. Provisional Application No. 60/526,891, filed on Dec. 3, 2003 entitled "System and Methods for Retrieval, Presentation, and Synchronization of Real-Time Points/Tags within a Class-Based Component and View Model".

FIELD

The application generally relates to information management strategies and more particularly to a system and methods for providing scalable data collection, modeling, and access solutions.

BACKGROUND

Information retrieval and management within a business or organizational enterprise typically presents numerous technical issues associated with data integration and interpretation, especially when the data originates from multiple sources. For example, difficulties frequently arise when attempting to unify and/or format large amounts of data for user visualization in terms of incurred administrative burden and complex programmatic logic. Additionally, integration of information from one or more sources configured to provide real-time data with other desired information presents accessibility, bandwidth, and latency problems limiting the flexibility and scalability of these systems as a whole.

A conventional computerized system associated with monitoring and controlling various operational parameters for components and sub-components of a manufacturing plant may be required to process large amounts of real-time and/or near real-time data. This data, referred to as point data, may arise from independent sources with each source configured to provide substantially "raw" or "native" information at pre-defined intervals such as numerical values associated with various gauge/monitor readings. Taken alone, this data may provide little or no context for its interpretation and require additional information to be associated with it to subsequently permit meaningful processing and analysis. It also may be desirable to capture, store and distribute the point data to other processing components requiring some degree of context be ascribed to the point data.

Modern industrial automation systems, supervisory control and data acquisition (SCADA) systems, general data acquisition systems and plant data historians represent but a few of the classes or categories of systems that may store and distribute real-time and/or near real-time information in the form of point data. In such systems, a Tag represents a structural data element associated with point data arising from various components of the system which are made accessible to other components, systems, applications and/or users. In general, point data is subject to dynamic change and is monitored, and reported through various operations and functions associated with processing the point data obtained from selected sources. In industrial automation and control systems, decision support and reporting capabilities may be provided based on Tag associated point data that is monitored over very short timeframes ranging in the sub-second to sub-minute range.

A limitation found in many conventional systems is that they provide only limited capabilities to access, interpret, and/or manipulate tag-based point data collectively or in connection with other non-point data. Non-point data relates to a broad category of context-providing information associated with point data that, in one sense, extend the functionality and meaning of the point data. Non-point data may include descriptive and/or attribute information characterizing the point data, as well as, other information such as limits, ranges, etc. In conventional systems, integral and flexible manipulation of tag-based point data and non-point data is restricted due to their inherent differences and properties.

A further difficulty encountered in conventional systems is the limited ability to integrate and relate tag-based data and non-tag-based data. Non-tag-based data may originate from numerous sources and relate to disparate aspects of an enterprise environment. For example, non-tag-based data may comprise data associated with conventional database applications/environments and include transactional information, production data, business data, etc. Conventionally, attempts to integrate non-tag-based data with tag-based information may be hindered or prevented completely as a consequence of the underlying differences in structure and content between these data types. As a result, generating and implementing logical constructions or schema in which both tag-based data and non-tag-based data are integrally used is problematic in conventional systems. Such limitations limit the overall flexibility of the system and increase the difficulty of scaling such systems to complex, enterprise-level environments.

Another important consideration to the integral management of point data and non-point data relates to the recognition of differences in desirable update or acquisition frequencies. The dynamic properties of point data give rise to time critical retrieval restrictions on systems designed to acquire and evaluate point data. Rapidly changing point data is generally acquired or refreshed at a high frequency (e.g. short retrieval time interval) to insure that the information is up-to-date. Other point data and non-point data information may be more static in nature and not require a similar short acquisition interval. Developing efficient and customizable data acquisition strategies for information retrieval which take into account data characteristics and optimal acquisition rates is important to insure accuracy and timeliness in the data without imparting undue computational or transmission load.

Conventional systems are not well suited to provide integration of customizable data-dependent acquisition strategies or associated acquisition rates. As a result, these systems experience reduced performance, especially in complex environments where data or values to be retrieved possess different optimal or desired refresh rates. Furthermore, these conventional systems fail to provide the ability to easily customize or configure differential acquisition strategies for point data and non-point data in such a manner so as to improve overall system performance. Consequently, there is a need to overcome these limitations integrating and managing tag-based information to provide improved mechanisms to associate and work with point data and non-point data within the same programmatic or logical environment.

SUMMARY

Various embodiments of the invention describe a system for developing computer models for the collection and display of data. A component builder functionality of the system generates reusable components for collecting point data and non-point data associated with at least one back-end data source. In one aspect, the point data comprises data collected from at least one addressable informational source and the non-point data comprises context-defining data associated with the point data. The non-point data may also comprise non-tag based non-point data that is to be desirably integrated with tag-based point data. A view builder functionality of the system generates reusable views that correspond to specific components generated by the component builder, whereby a user can generate one or more views that specify how the point data and non-point data collected by a corresponding component is to be displayed.

Various embodiments of the invention further provide a method of generating a computer model for the collection and display of aggregated point data and non-point data. In at least one embodiment, the method further comprises the steps of: Collecting point data comprising data collected from at least one addressable informational source based upon a specified point data acquisition strategy; Collecting non-point data comprising context-defining data associated with the point data based upon a specified non-point data acquisition strategy; Identifying one or more relationships associating the point data and non-point data; and Displaying the point data and non-point data in a first aggregate view.

Various embodiments of the invention further provide a method of generating a computer representation used in the collection of aggregated point data and non-point data. In at least one embodiment, the method comprises the steps of: Collecting point data comprising data collected from at least one addressable informational source; Collecting non-point data comprising context-defining data associated with the point data; Identifying one or more relationships associating the point data and non-point data so as to define a base component; and Defining a first extended component comprising an instantiation of the base component wherein at least a portion of the point data and non-point data of the base component is used in the first extended component.

Various embodiments of the invention further describe a system of generating a computer representation used in the collection of aggregated point data and non-point data. In at least one embodiment, this system further comprises a first data acquisition component the provides functionality for collecting point data comprising data collected from at least one addressable informational source; a second data acquisition component that provides functionality for collecting non-point data comprising context-defining data associated with the point data; and a component builder that provides functionality for identifying one or more relationships associating the point data and non-point data so as to define a base component; the component builder further providing functionality for defining a first extended component comprising an instantiation of the base component wherein at least a portion of the point data and non-point data of the base component is used in the first extended component.

Various embodiments of the invention further provide a computer model for the collection of data from multiple sources, comprising, within computer storage: At least one instance of at least one base component, each instance of the at least one base component including point data comprising data collected from at least one addressable informational source and non-point data comprising context-defining data associated with the point data; At least one instance of at least one extended component, each instance of the at least one extended component comprising an instantiation of at least one base component wherein at least a portion of the point data and non-point data of the at least one base component is used in each instance of the at least one extended component; and A first reusable view that specifies how data collected by instances of the at least one base component and the at least one extended component are to be displayed.

Various embodiments of the invention further provide a computer model for the collection of data from multiple sources. In at least one embodiment, this model further comprises within computer storage: (a) At least one instance of at least one first component, each instance of the at least one first component including point data and first non-point data collected from at least one tag-based informational source and second non-point data collected from at least one non-tag-based informational source wherein the first non-point data comprises context-defining information associated with the point data and the second non-point data comprises information associated with a data management application; and (b) At least one instance of at least one second component, each instance of the at least one second component comprising an instantiation of at least one first component wherein at least a portion of the point data and non-point data of the at least one first component is used in each instance of the at least one second component.

Various embodiments of the invention further provide a system for developing computer models for the collection and display of data. In at least one embodiment, such a system further comprises a component builder that provides functionality for generating reusable components for collecting tag-based point data and first non-point data associated with at least one back-end data source, wherein the point data comprises data collected from at least one addressable informational source and the first non-point data comprises context-defining data associated with the point data; the component builder further providing functionality for collecting second non-point data associated with a non-tag-based informational source; and a view builder that provides functionality for generating reusable views that correspond to specific components generated by the component builder, whereby a user can generate one or more views that specify how the point data and non-point data collected by a corresponding component is to be displayed.

Various embodiments of the invention further provide a method of generating a computer representation used in the collection of aggregated point data and non-point data. In at least one embodiment, this method comprises the steps of: Collecting point data comprising data collected from at least one addressable informational source; Collecting first non-point data comprising context-defining data associated with the point data; Collecting second non-point data comprising data associated with a non-tag-based informational source; Identifying one or more relationships associating the point data and first non-point data so as to define a base component; and Defining a first extended component comprising an instantiation of the base component wherein at least a portion of the point data and first non-point data of the base component is used in the first extended component in combination with the second non-point data.

Various embodiments of the invention further describe system and methods for integrating point data and non-point data associated with a tag-based environment such that data may be used in connection with non-tag-based non-point data. In one aspect, the combination and use of tag-based data and non-tag-based data is accomplished through the formation of a joined table comprising tag-based point data and non-point data which is set forth in a structure amenable for use with non-tag-based data structures.

Various embodiments of the invention further describe methods for managing information associated with at least one tag-based system. These methods further comprise: Identifying at least one point data source associated with the at least one tag-based system configured to provide point data; Identifying at least one non-point data attribute associated with the point data of the at least one point data source wherein the at least one non-point data attribute is used in the development of a data acquisition rule for acquiring point data from the at least one point data source, and populating a tag-based data structure with the at least one non-point data attribute and acquired point data from the at least one point data source thereby integrating the point data and non-point data in a manner that provides combined accessibility.

BRIEF DESCRIPTION OF DRAWINGS

These and other aspects, advantages, and novel features of the various embodiments of the invention are set forth in the following detailed description and upon reference to the accompanying drawings. In the drawings, same elements have the same reference numerals in which:

FIGS. 4A-D illustrate examples of the organization of point data and non-point data within the system of the present teachings.

FIGS. 7A-C further illustrate the exemplary modeled approach to tag/component definition.

DETAILED DESCRIPTION

Figure 1:
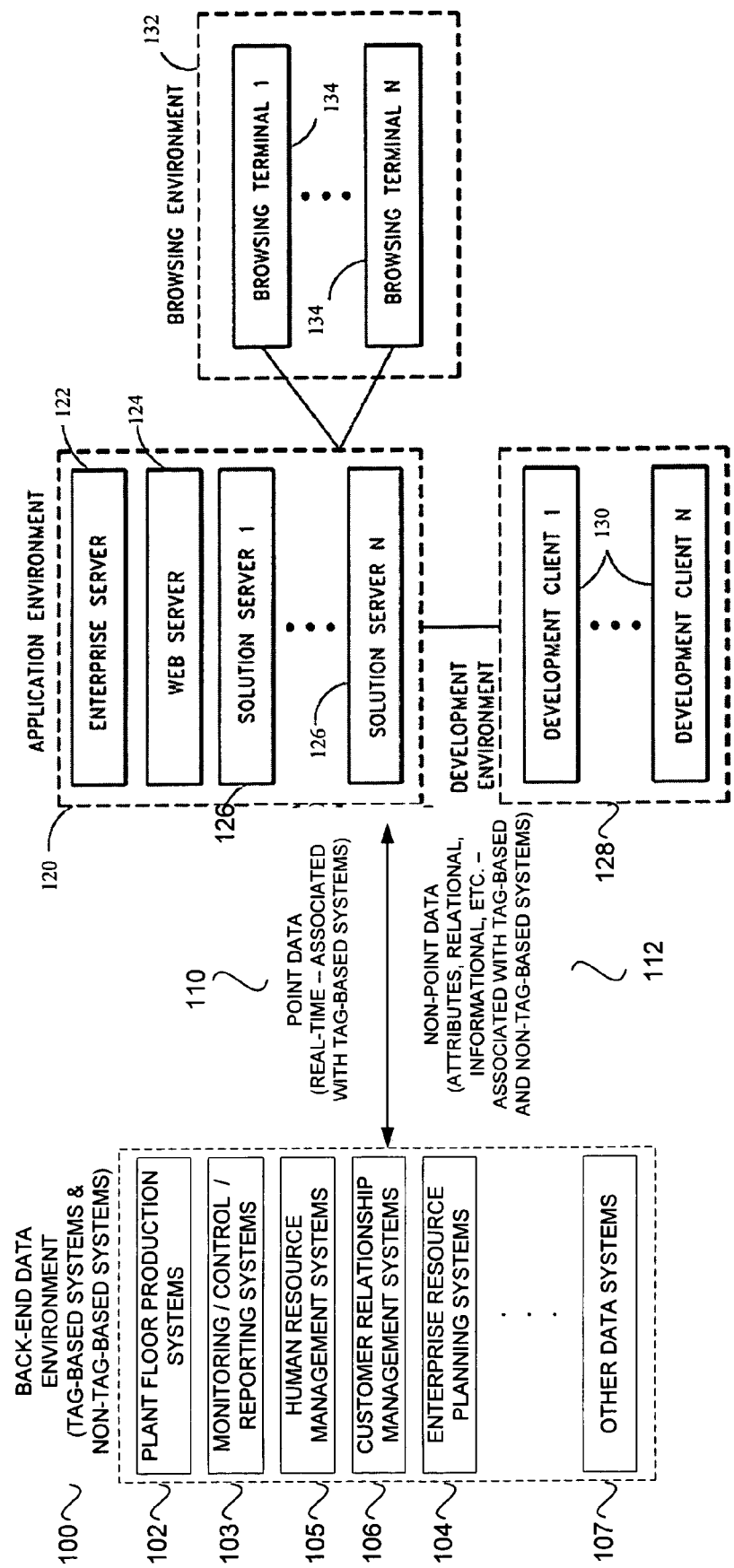
FIG. 1 illustrates a point data and non-point data acquisition system according to various embodiments of the invention.

In various embodiments, the invention provides improved mechanisms for retrieving, manipulating, organizing, and analyzing information in systems where point data and non-point data coexist. In particular, novel mechanisms for organizing this information in a class-based representational model supporting Tags is disclosed. As will be described in greater detail below, certain aspects of the methods for data management provide formulations for data structures used to store and manipulate both point data and non-point data in a cohesive manner. Numerous benefits may be realized from the disclosed methods of integrated data management including improved system performance and reduced bandwidth consumption.

As used herein, point data may be characterized as current, real-time, or value data often associated with one or more instruments, components, or portions of a manufacturing, industrial, commercial, or other system. Any of these apparatuses may be configured to generate, measure, and/or sample data that relates to one or more point data sources of interest. For example, a data acquisition system for a particular instrument or machine may continuously or periodically acquire data reflecting a motor's operating speed and/or operating temperature as point data from a point data source associated with the motor. In certain instances, the point data may be a simple numerical or string value. Point data may further be associated with monitoring, control, and reporting functions of various instruments, components, and applications to provide information relating to the operation of a selected system. This information may also be made available for collection and review by various data acquisition and control systems.

Point data is often acquired in a raw or unstructured form wherein the point data reflects a numerical or string value without supporting details, description, and/or attributes. As previously described, certain types of point data may be associated with real-time or near real-time information (e.g. current temperature, pressure, speed, voltage, current, etc.) that may be desirably sampled, updated or refreshed relatively frequently. The exact frequency of these operations is typically dependent on the characteristics of the point data itself and may be different across the multiple point data sources incorporated into a particular system. Providing a mechanism to allow for customization of the acquisition strategy for various classes of point data becomes increasingly significant as the size or complexity of the system grows to reduce unnecessary queries, data calls and computational load.

As will be appreciated by those of skill in the art, the context in which point data is to be interpreted may be readily lost or confused. To give point data context it may therefore be desirable to associate certain non-point data with the point data. Non-point data may take many forms, including but not limited to, attribute information, parameters, limits and other descriptive information. As used herein, the terms point data and non-point data encompass various categories of information which are not necessarily constrained to the examples described herein. As such, the various embodiments of the invention may be applied to a variety of different contexts embodied in the combination and use of point data and non-point data.

Other useful non-point data may include information such as maintenance work orders (relational data or API (Application Programming Interface) structure data from maintenance systems), equipment documentation (unstructured data usually contained within operating system files and documents), and information such as URL (Uniform Resource Locator) links to supplier web sites. These types of non-point data may be associated with non-tag based information contained, for example, within Oracle® or SAP® databases/environments. Non-point data therefore represents a broad class of information that may be associated with point data providing a contextual and informational basis.

Various embodiments of the invention provide mechanisms to integrate tag-based data (including point data and non-point data) with non-tag-based data. Conventionally, these two types of data may be structurally or programmatically incompatible with one another due to the environment or applications in which they are used. Certain features of the invention overcome these conventional limitations to allow tag-based data and non-tag-based data to be better integrated, managed and utilized within the same environment. As will be described in greater detail below such integration desirably provides improved abilities to perform numerous tasks including presenting composite tag-based and non-tag-based views.

On exemplary architecture in which tag-based and non-tag-based data (as well as point data and non-point data) may be collectively utilized is the XHQ software platform (developed and distributed by lndX Software Corporation, Aliso Viejo, Calif.) The XHQ application may be configured to provide a data aggregation and modeling framework and tools for retrieving, manipulating, analyzing, and associating tag-based and non-tag-based data (as well as point data and non-point data) from one or more sources. A significant enhancement of the XHQ software architecture provided by the present teachings is the ability to bring tag-based and non-tag-based data (as well as point data and non-point data) together in a manner that is class-oriented and highly configurable. Furthermore, the present teachings allow for the generation of customizable "views" capable of supporting a wide audience of users and specific application requirements. Additional details of the configuration and use of this system may be found in the XHQ user manuals.

Utilization of the various embodiments of the invention provides a mechanism by which to manage information obtained from one or more back-end data systems. Back-end data systems may include various conventional systems for receiving and processing point data and non-point data. In certain instances a back-end data system has only limited capabilities to provide, receive, or process point data whereas in other instances the back-end data system may process both point and non-point data. In the context of a tag-based architecture, various back-end data systems may be used to collect point data and perform operations in which non-point data is associated with point data. Each so called "Tag" may therefore represent a data structure comprising a selected quanta of information associated with a particular point data informational source and may also comprise certain non-point data. The various embodiments of the invention provide a mechanism for extending tag-based data management capabilities allowing for improved integration of point data and non-point data. Such features are especially useful across enterprise-level environments wherein large amounts of point data and non-point data are to be collectively managed.

In the context of informational aggregation, tag presentation, and data warehousing, the various embodiments of the invention may be adapted to synchronize point data and non-point data and, additionally, "join" or merge this data in an object-oriented system or class-like manner to provide improved flexibility in the handling, processing and display. As will be described in greater detail below providing a coherent and current representation for each tag facilitates implementation of a flexible class-based component and view model.

In conventional systems, configuration of a data acquisition to acquire each Tag's current value (e.g. point data associated information) generally requires a unique configuration for each tag and possibly each tag's attributes (e.g. non-point data). Considering that it is not uncommon for complex industrial automation applications to contain upwards of 100,000 Tags, it will be appreciated that the individualized configuration and management of Tags in the aforementioned manner can be very time consuming, inefficient, and error prone. Furthermore, conventional mechanisms for control, monitoring, or archiving of Tag-based information tend to become even less useful when attempting to aggregate such information across multiple systems such as in the context of other plant production systems and applications.

The various embodiments of the invention provide mechanism by which to effectively address the aforementioned limitations using a novel approach that combines acquiring the non-point data (e.g. attributes and other information that does not change frequently) using a periodic query-based mechanism that does not change frequently with a rule-based or template approach that directs the acquisition of more rapidly or frequently changing point data (e.g. a Tag's real-time or current value). Furthermore, the rule-based or template acquisition approach generally does not require individual Tag configuration thus providing for more rapid development of data organization and visualization tools.

FIG. 1 illustrates components of an exemplary data acquisition and management system according to at least one embodiment of the invention. A back-end data environment 100 comprises various tag-based systems and non-tag-based systems. These data sources may include, for example, plant floor production systems 102, monitoring/control/reporting systems 103, enterprise resource planning data systems 104, human resource management systems 105, customer relationship management systems 106, and other data systems 107. Data arising from the back-end data environment 100 may comprise point data 110 such as the aforementioned current or real-time operational values and non-point data 112 which arises from or is associated with tag-based systems such as the aforementioned plant floor production systems 102 and monitoring/control/reporting systems 103. Non-point data associated with these tag-based systems may further include attribute information used to characterize, contextualize, or identify the point data and/or point data source.

In addition to tag-based non-point data, non-tag-based non-point data may be associated with various back end system resources such as the enterprise resource planning data systems 104, human resource management systems 105, and customer relationship management systems 106. Conventionally, non-tag-based non-point data may be associated with various database and data management applications that provide such data in a form that is not readily compatible/integrateable with certain components of the tag-based system data for the aforementioned reasons (e.g. format, structure, application-dependence, etc.). As will be described in greater detail below, the various embodiments of the invention overcome these limitations providing efficient mechanisms that allow tag-based point and non-point data to be integrated and related within the same environment for purposes including but not limited to management/retrieval/development/review.

The various components of the back-end data environment 100 are connected to an application environment 120 such that the point data 110 and non-point data 112 (both tag-based and non-tag-based) are accessible to the application environment 120 and may be stored and processed therein. In this context, the term connected means directly or indirectly capable of communicating over a direct wired, network or wireless connection. The application environment 120 may comprise an enterprise server 122, a web server 124, and/or one or more solution servers 126. The application environment 120 may further be connected to a development environment 128. The development environment 128 comprises one or more development clients 130. In various embodiments, the enterprise server 122, solution servers 126 and development clients 130 may consist of application programs developed, for example, in a language such as Java and/or C++ which run under an operating system such as the Windows™ (a product of Microsoft Corp.) family of operating systems.

The application environment 120 may further be connected to a browsing environment 132. The browsing environment 132 comprises one or more browsing terminals 134. Each browsing terminal 134 comprises a communication program such as a web browser. In various embodiments, the browsing terminals 134 are connected to the application environment 120 through the Internet using a web browser such as Netscape Communicator or Internet Explorer launched from the browsing terminals 134. In other embodiments, the browsing terminals 134 are connected to the application environment 120 through an Intranet.

In various embodiments, the invention provides a mechanism to integrate acquired point data 110 and non-point data 112 in a unified manner using an object-oriented representational model for data acquisition and management. Further provided is a mechanism to customize the data acquisition process by associating configurable acquisition frequencies or fetch intervals for the information to improve overall system efficiency. The configurable acquisition frequencies can be adjusted to accommodate the both point data 110 and non-point data 112, as well as, the rate at which this data will change or be refreshed to provide the application environment 120 with up-to-date information.

The aforementioned informational acquisition and management features desirably improve system performance and decrease bandwidth consumption by avoiding unnecessary or redundant data requests from the back-end data environment 100. More specifically, the system provides options and functionality for conveniently specifying and grouping various information to be fetched from the back-end environment 100 and processed by the application environment 120. In various embodiments, the data grouping functionality utilizes Tag collections to model point data acquisitions from one or more point data sources. The Tag collections further facilitate defining and modeling components within the back-end data environment 100 and provide a reusable resource that can be used to enhance the development process especially in large or complex systems.

In conventional systems lacking the aforementioned features of easily combinable point data and non-point data accessibility, significant penalties can be observed in terms of increased development time, complex system modeling, and inefficient data reporting. A common problem observed in conventional systems is that data fetching occurs too frequently for data that does not require refreshing or updating at the rate at which it is refreshed. Consequently, these systems may be subject to potentially wasted system resources and adverse affects in overall data accessibility. Additionally, conventional systems that fail to fetch data frequently enough present a problem as the data may become unacceptably out-dated (e.g. "stale") and inaccurately reflect the current status or state of the point source from which the information was acquired. The various embodiments of the invention overcome these and other limitations by providing a highly configurable means to tune data acquisition rates or fetching frequencies helping to insure accurate and timely representation of the point data 110.

Unlike the rudimentarily configurable data fetching capabilities of some conventional systems, the various embodiments of the invention may be adapted for ease of use in a class-based environment. The various embodiments of the invention may further provide class-based arrangements allowing for configuration, control, and monitoring of point data 110 and non-point data 112 with customizable fetch frequencies.

Figure 2:
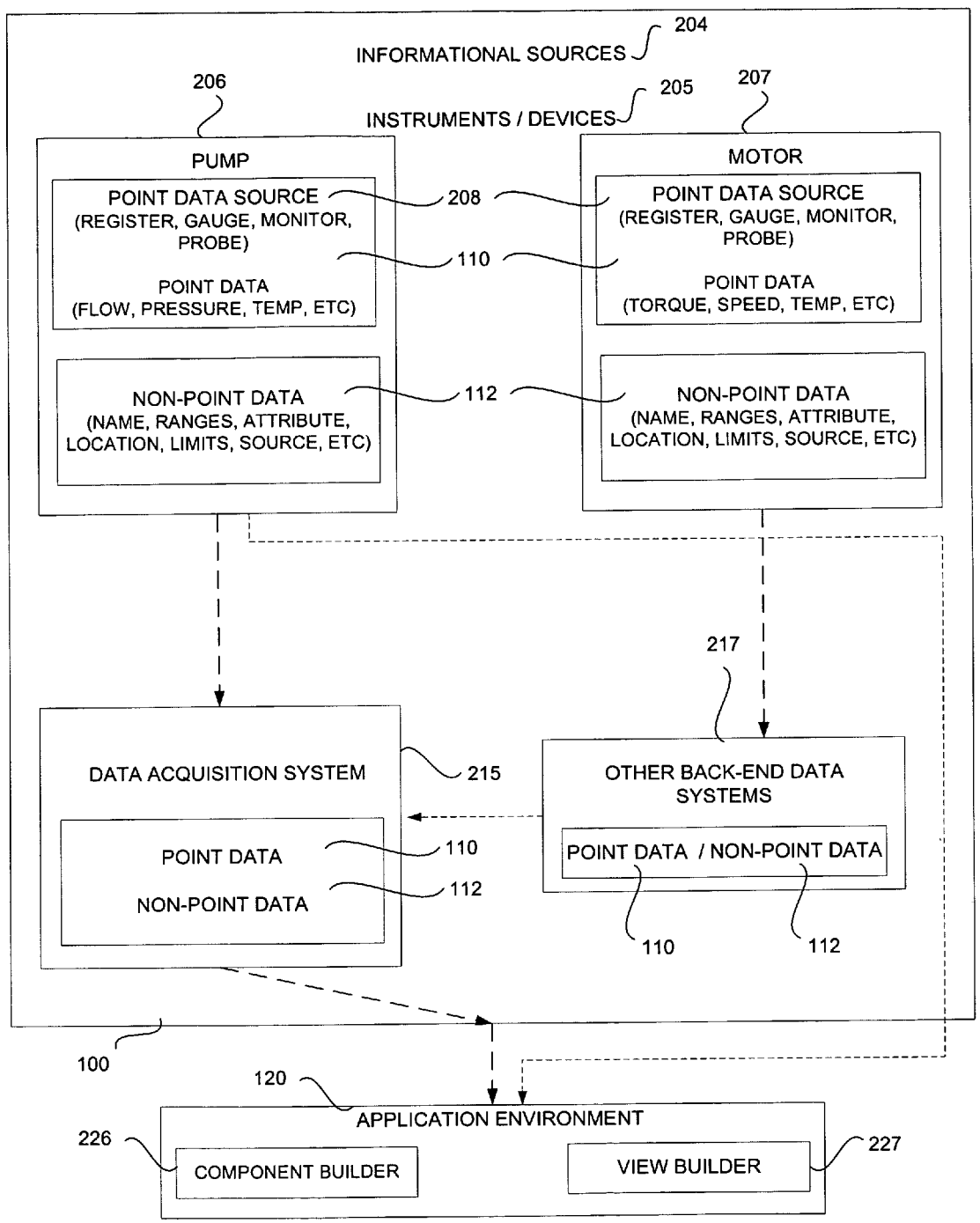
FIG. 2 illustrates an exemplary system having a plurality of instruments or devices each with one or more associated point data sources.

FIG. 2 illustrates a block diagram of an exemplary mechanism for association of point data 110 to non-point data 112.

In one aspect, the information may arise from a plurality of informational sources 204 shown by way of example as instruments or devices 205 including an exemplary pump 206 and exemplary motor 207. The informational sources 204 may further comprise point data sources 208 associated with a particular instrument or device 205 including for example; registers, gauges, monitors, or probes from which point data 110 may be generated and subsequently fetched or acquired. Non-point data 112 may also be associated with each informational source 204 including for example; names, ranges, attributes, locations, limits, sources, among other information. Certain non-point data 112 may be provided by a selected informational source 204 in connection with the point data 110, or alternatively, the non-point data 112 may be subsequently associated with the point data 110 as will be described in greater detail below.

In one aspect, point data sources 208 correspond to addressable points of the informational sources 204 and may be referred to as a Tag. A Tag comprises a collection of desired point data 110 and non-point data 112 utilized or processed by the application environment 120. Each Tag may further reflect a data structure used for storing point data 110 and/or non-point data 112 acted upon by the application environment 120. It will be appreciated that "point data" and "Tags" reflect terms used in various processing and manufacturing industries to define sources of uniquely identifiable values for various instrument and apparatus functionalities and features but may also be applied in other contexts and systems.

Each point data source 208 may be associated with a measurable or monitorable feature from which point data 110 may be requested and collected. For a given instrument or device 205, a plurality of such point data sources may exist with the point data 110 generated by, or associated with, each point data source 208 subject to relatively frequent change and generally representative of a current state or operational condition of that point data source 208. Point data 110 may further be acquired either directly or indirectly by components of the application environment 120 and associated with non-point data 112 which is recognized by the components of the application environment 120. In various embodiments, association of certain non-point data 112 with the point data 110 may be accomplished by the instrument 205 or alternatively non-point data 112 associations may be performed by other components of the system. In various instances, association of point data 110 with non-point data 112 may occur substantially transparently to the point data sources 208 and/or various associated back-end data systems.

In general, non-point data 112 is associated with point data 110 and reflected in the Tag data structure. Together this information may be used by the application environment 120 for the purposes of monitoring, control, and analysis and to assess the state or condition of selected instruments or systems within the back-end data environment 100.

Point data 110 and non-point data 112 may be received by a data acquisition system 215 configured to collect information from various point data sources 208 or other back-end data systems 217 associated with corresponding point data sources 208. In various embodiments, the data acquisition system 215 and back-end data systems 217 typically provide only limited functionality in terms of data acquisition and management but may serve as a source of point data 110 and non-point data 112 for the application environment 120. Alternatively, the application environment 120 may be configured to acquire point data 110 and non-point data 112 directly from the various back-end data systems 217 and point data sources 208. In such instances, the application environment 120 is capable of interacting with the various components of the back-end data environment 100, systems 215, 217 and/or point data sources 208 to collect information about each desired point data source 208 and associated non-point data 112.

As previously described, point data 110 may originate from many point data sources with each having differing volatility or longevity characteristics. In one aspect, these characteristics describe how dynamic the point data 110 is expected to be wherein certain point data may be characterized as relatively static or infrequently changing and other point data may be characterized as relatively dynamic or more frequently changing. Thus, the point data 110 acquired from the systems 215, 217 or point data sources 208 may posses a wide range of temporal qualities ranging from substantially never changing to changing substantially every instant. One feature of the data acquisition and management system of the various embodiments of the invention is that it provides a mechanism for conveniently associating with each point data source 208, a configurable data fetch or acquisition frequency such that the application environment 120 can be configured to obtain, refresh, or update the point data 110 as needed or desired.

In various embodiments, the point data 110 may comprise a wide variety of different constructions of data. For example, the point data 110 may relate to real-time operational data for an informational source 204 or back-end data system 215, 217 including temperature, pressure, speed, etc. In certain instances, the point data 110 may be a primitive value not carrying with it a description of the point data source 208 from which it was obtained. In other instances the point data 110 may be associated with non-point data 112 including attribute information which characterizes the point data source 208 (e.g. instrument name) or point data 110 itself (e.g. data units). Certain non-point data or attributes 112 may be further defined for the point data sources 208. These may include for example, operational ranges, point data source names or associations, and other information. The non-point data or attribute information 112 may be assigned by the data acquisition systems 215, 217 used to acquire the point data 110 or may be assigned directly by components of the application environment 120. In various embodiments, non-point data or attribute information 112 reflects more static information than point data 110 and typically does not change at the same frequency as the point data 110 itself. As a result of the more static character of this information the acquisition rate or fetch frequency may be desirably adjusted to be correspondingly lower.

In one aspect, a component builder 226 and solution builder 227 may be associated with the application environment 120. The component builder 226 provides functionality for defining, generating, managing, and visualizing various component data structures used for point and non-point data acquisition/integration in accordance with various embodiments of the invention. The solution builder 227 provides functionality for creating views or visualizations of components generated with the component builder 226.

In one aspect, the component builder 226 and solution builder 227 allow point and non-point data 110, 112 to be flexibly organized and presented using a graphically driven approach. In such an approach, a user is able to create one or more components and views in an iconically and menu-driven manner. Furthermore, these builders 226, 227 may utilize intuitive and semi-automated mechanisms for point data and non-point data integration which facilitates design and manipulation of the data 110, 112 at small and large scales alike.

The aforementioned XHQ software platform represents an exemplary architecture that may be configured to benefit from the implementation of the component builder and solution builder functionalities 226, 227. While depicted as being associated with the application environment 120, it will be appreciated that the component builder 226 and solution builder 227 may be integrated with various components of the system 100 such as the development environment 128.

Figure 3:
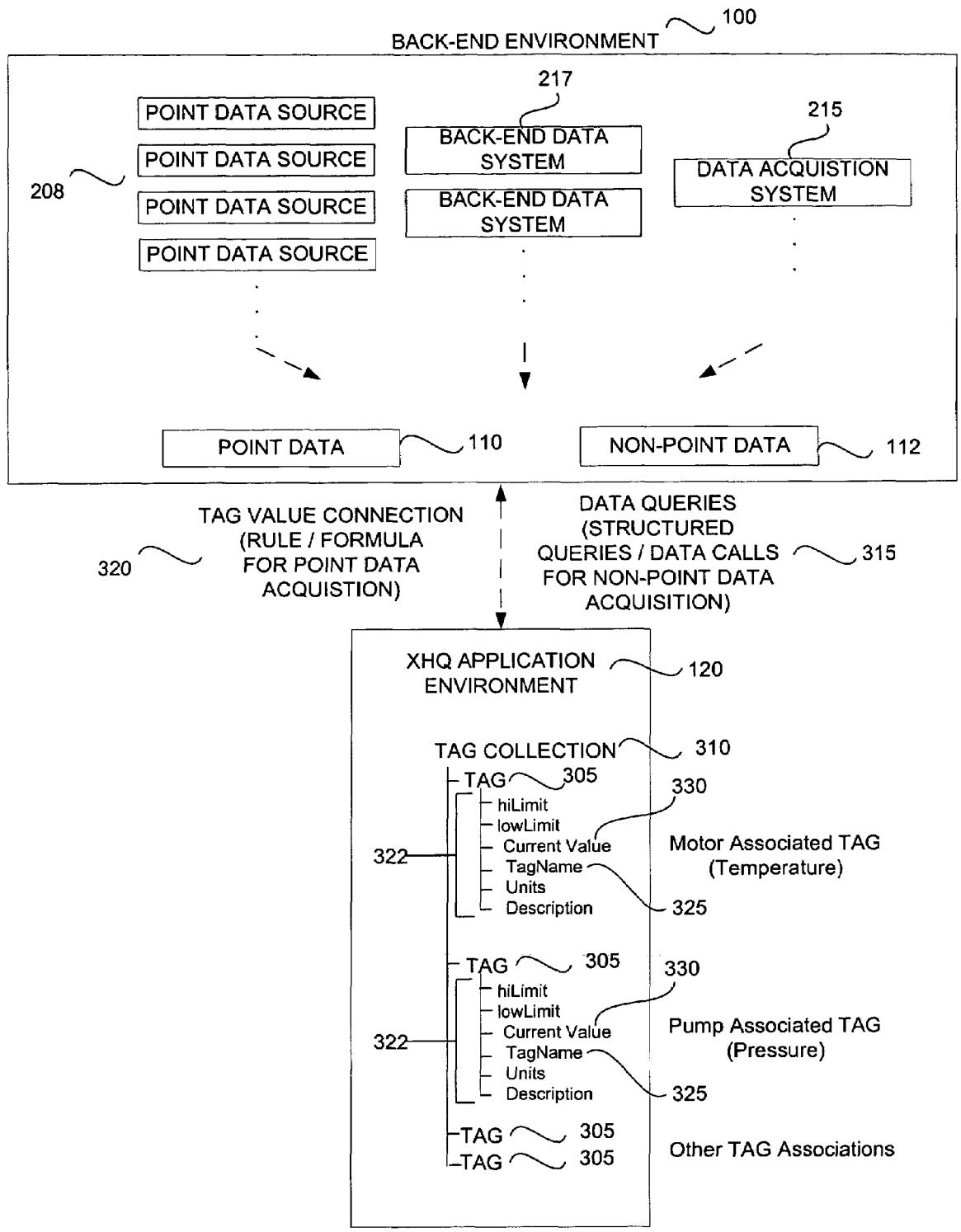
FIG. 3 illustrates an overview of the relationship between point data and non-point data associated with back-end sources utilized by an application environment.

FIG. 3 further illustrates an overview of the relationship between point data 110 and non-point data 112 associated with the back-end environment 100 and the tag representation and collections utilized by the application environment 120. In one aspect, point data 110 and non-point data 112 obtained from selected point data sources 208, back-end data systems 217, data acquisition systems 215, and/or application environment 120 may be stored in one or more Tags 305 organized as a Tag collection 310. Each Tag collection 310 represents a grouping of Tags 305 that are logically associated and representative of a data solution corresponding to some or substantially all of the desired point data 110 and non-point data 112 for a particular instrument, apparatus, system, view, etc. This is exemplified in the Figure as a motor-associated temperature Tag, a pump-associated pressure Tag, and additional unspecified Tags. In various embodiments, each data solution may be visualized as a hierarchical ordering or data structure capable of being displayed and navigated in a visually intuitive manner. As will be described in greater detail below, this manner of data organization confers substantial flexibility in data collection and presentation allowing customizable views and solutions to be developed in a relatively straightforward manner.

In one aspect, each Tag 305 is representative of a reusable component which may comprise one or more tag component members 322 associated with point data 110 and/or non-point data 112. Each Tag 305 may further be associated with one or more "views" each of which are representative of a reusable visualization of the information contained within the Tag 305. In certain embodiments, each view references certain Tag member information including portions of the point data 110 and non-point data 112 which may be displayed or visualized in a specified manner. Aspects of Tag visualization in this manner may include the use of animation techniques to graphically depict the Tag's conditions and information.

In various embodiments, each Tag collection 310 contains a plurality of similarly-defined Tags 305 each of which may be associated with different selected informational sources 204, point data sources 208, or other system components or subcomponents for which point data 110 and non-point data 112 may be desirably accessed and visualized. One benefit conferred through the use of the Tag collection 310 and constituent Tags 305 is that each Tag 305 sets forth the principal information and fields for inclusion of a point data source 208 into the Tag collection 310. Each Tag 305 may comprise a similar structure and may further provide predefined or default data access rules and operations for accessing point data 110 and non-point data 112. Consequently, adding new Tags 305 (e.g. newly monitored point data sources 208) may comprise appending additional Tags 305 to the Tag collection 310 as needed or desired.

Because of the logical organization of the Tags 305 and the information contained therein, data integrity even in very large monitoring environments is relatively easy to preserve and the system is highly scalable. Another benefit imparted by the use of Tags 305 in the aforementioned manner is that rules and operations may be applied across a multiplicity of Tags 305 with relative ease without the need to independently edit or modify each Tag 305. Such a feature is useful, for example, when specifying the refresh/update frequency and/or instructions for informational access. The construction of each Tag 305 provides a mechanism for defining operations "globally" that are subsequently resolved to identify the appropriate point data source 208 or other component from which the point data 110 and non-point data 112 may be obtained.

Performance in the system is improved by providing the ability to define data access constructs for point data 110 and non-point data 112 that are suited to the task of acquiring the information at the appropriate frequency. For example, non-point data 112 may be obtained by database query language queries 315 such as SQL (Structured Query Language) or SQL-like queries to refresh selected information contained within the Tag collection 310. Such queries 315 are suited to access and retrieve generally static information such as non-point data 112 associated with a selected Tag 305. In certain implementations, each construct 315 is configured to access and provide the results of various query columns associated with selected tag component members 322. Queries 315 may be associated with both point data 110 and non-point data 112 although, in general, queries 315 are typically directed towards information which changes infrequently (e.g. non-point data 112).

One or more "Tag" value connections 320 may further be defined for selected point data associated tag component members 322 that are determined to change relatively frequently (e.g. current value or set point). In various embodiments, a "Tag" value connection 320 need be specified only once per Tag component member 322 of interest. The Tag value connection 320 may further be based on a template or rule which can be generically applied across a portion or substantially all of the Tags 305 without requiring explicit specification for each Tag 305.

To improve the flexibility of the system, each Tag 305 and associated tag component member(s) 322 may be associated with a name identifier 325. The name identifier 325 provides a convenient mechanism to access a specific or desired Tag 305 and component member(s) 322 contained therein. Furthermore the name identifier 325 may be used in connection with formulas, expressions, or rules to provide improved accessibility to the information contained within the Tag 305. The name identifier 325 may further be configured such that this information may be used as a reference to indicate an appropriate tag component member 322 whose value is to be associated with information (e.g. point data 110 or non point data 112) from the back-end environment 100.

Tag rules provide instructions for accessing the appropriate value or information from the desired resource(s) of the back-end data environment 100. For example, a rule may be defined such that the name identifier 325 of a selected Tag 305 is used as a reference to populate a selected tag component member, Current Value 330 with point data 110 obtained from a designated resource of the back-end data environment 100.

As another example, a selected back-end environment resource may comprise an addressable point data source 208, the value of which is stored in the Current Value field 330 of a selected Tag 305. The Current Value field 330 (as well as other tag component members 322) may store a wide variety of point data information including current temperatures, speeds, pressures, and other real-time/near real-time information which are desirably monitored and refreshed at a relatively high frequency. Likewise, non-point data 112 may include attributes associated with the point data 110 such as machine or instrument names, area, region, organization, unit, high-ranges, low-ranges, units associated with the point data 110, descriptions of the Tag 305, and other information. This information may be populated within a selected Tag 305 using the aforementioned data queries 315 to provide context to the point data 112.

In various embodiments, the application environment 120 may be configured to utilize a combination of data queries 315 and tag value connections 320 to identify and acquire appropriate data and information to be accessed from the back-end data environment 100 and store this information within an appropriate tag component member 322 (e.g. for example in a temperature-associated TAG and a pressure-associated TAG). As previously indicated to preserve bandwidth and improve system performance each point data 110 and non-point data 112 request may be associated with various selected refresh frequencies to maintain a balance between keeping information within the Tag 305 up-to-date and avoiding unnecessary data requests.

While the Tag collection shown in FIG. 3 is composed of a plurality of Tags of homogeneous composition, it will be appreciated that other Tag collections can be readily devised in accordance with the various embodiments of the invention, the composition of which may comprise additional/different tag component members 322. It one aspect, it may be desirable to maintain a Tag collection having a singular Tag composition defined by substantially identical tag component members 322 (e.g. similar to that shown). Such a configuration desirably conveys uniformity amongst all point data 110/non-point data 112 acquisitions. However, it is conceived that instances exist where a Tag collection may be desirably formed as a plurality of Tags of heterogeneous composition. Providing multiple compositions of Tags may be useful in accommodating a variety of different point data 110/non-point data 112 acquisitions that may or may not be logically or functionally compatible with one another.

FIGS. 4A-D illustrate examples of the organization of point data 110 and non-point data 112 within the system and how this information may be accessed and manipulated. In one aspect, point data 110 and non-point data 112 may be stored in one or more databases, tables, or intermediate storage data structures such as in tables 405, 406. An exemplary non-point data storage mechanism is reflected by table 405 which may comprise a plurality of fields 410 associated with a plurality of different point data sources 208, instruments, apparatuses, devices, or other resources of the back-end data environment 100. In one aspect, the fields 410 of the table 405 represent non-point data 112 that is expected to change relatively infrequently and may be accessible to the application environment 120 through the use of the aforementioned data queries 315. The table 405 and information contained therein may reside on a selected resource of the back-end environment 100, a data acquisition system 215, other back-end data system 217, or within a portion of the acquisition environment 120 itself.

In the illustrated example, the fields 410 of the table 405 correspond to a NAME field (identifier string) 415, an ID field (identifier number) 420, a HLIMIT field (high limit) 425, a LLIMIT field (low limit) 430, an EUNIT field (unit associated with point data) 435, and a DESC field (informational) 440. Each field may be configured as desired and may for example represent string data or numerical values (real, integer, etc). Each of the fields 410 serve to characterize or give context to a selected component or point data source 208 within the system which is to be monitored and associate certain attributes with the component or point data source 208 in the form of non-point data 112. The attributes associated with the selected component or point data source 208 may include descriptive information, operational parameters, as well as, other desired information.

For example, the component entries identified as P100-P102 reflect non-point data/attribute information used to characterize various operational parameters for point data 110/point data sources 208 associated with an exemplary pump (e.g. Pump Temperature, Pump Pressure, and Pump Speed). This information may include a designated name (stored in the NAME field), a numerical identifier (stored in the ID field), an upper operational limit (stored in the HLIMIT field), a lower operational limit (stored in the LLIMIT field), units to be associated with point data 110 obtained from the point data source 208 (stored in the EUNIT field), and a corresponding brief description of the selected component (stored in the DESC field). Information stored in the fields 410 may be selectively accessed through the aforementioned data queries 315 or other retrieval mechanisms to provide tag attribute information which may be subsequently associated with point data 110 relating to a specific component or point data source 208 within the back-end data environment 100.

Similarly, these fields 410 may also be used in connection with point data 110/point data sources 208 associated with an exemplary conveyor (e.g. Conveyor Speed and Conveyor Operational Status). As applied to the conveyor, the fields 410 may take on different values and context. For example, the name 415, ID 420, limits 425, 430, units 435, and description 440 may be populated to reflect values appropriate to point data sources 208 associated with the conveyor. Furthermore, certain fields may be left unpopulated, associated with a default value, associated with a void or null value, or populated in other manners depending on the nature of the point data 110/point data source 208 which they are associated (e.g. note differences in conveyor speed fields and conveyor operating status fields). Based on the foregoing, it will be appreciated that the fields 410 of the non-point data/attribute table 405 may be constructed so as to accommodate substantially all of the information desired to be associated with point data sources 208 within the system.

Similarly, point data 110 relating to those components described above may be separately stored in an analogous manner to the aforementioned non-point data as exemplified in table 406. The information in this table 406 may comprise one or more fields 455 including a NAME field (identifier string) 460, an ID field (identifier number) 465, and a VALUE field (current/real-time value) 470. In one aspect, the table 406 containing point data 110 may represent only limited information relating to each component or point data source 208 and lack the corresponding descriptive qualities and attribute information associated with the non-point data table 405. The point data 110 stored in this table 406 may represent the current or real-time values for each selected component or point data source 208 which is to be desirably accessed at a relatively high frequency to insure that the information contained in the application environment 120 is up-to-date. As previously indicated, the information contained in this table 406 may be acquired through the use of tag value connections 320 designed to extract selected information from the table 406 at a desired rate or frequency.

In one aspect, each point data value for a selected point data source 208 (stored in the VALUE field) may be associated with corresponding identification information (stored in the NAME and ID fields) which may be used to relate the point data 110 of the table 406 with the non-point data 112 of the table 405. In other embodiments, the point data values may lack corresponding identification information and present only raw-data values. In instances where the point data 110 lacks or possesses minimal corresponding identification information the application environment 120 may provide the proper mapping functionalities to associate the point data 110 with the appropriate non-point data 112 contained in the table 405. Taken together the two sources of point data 110 (acquired from table 406) and non-point data 112 (acquired from table 405) may be used to populate a selected tag collection 310 defined in the application environment 120.

Figure 4A:
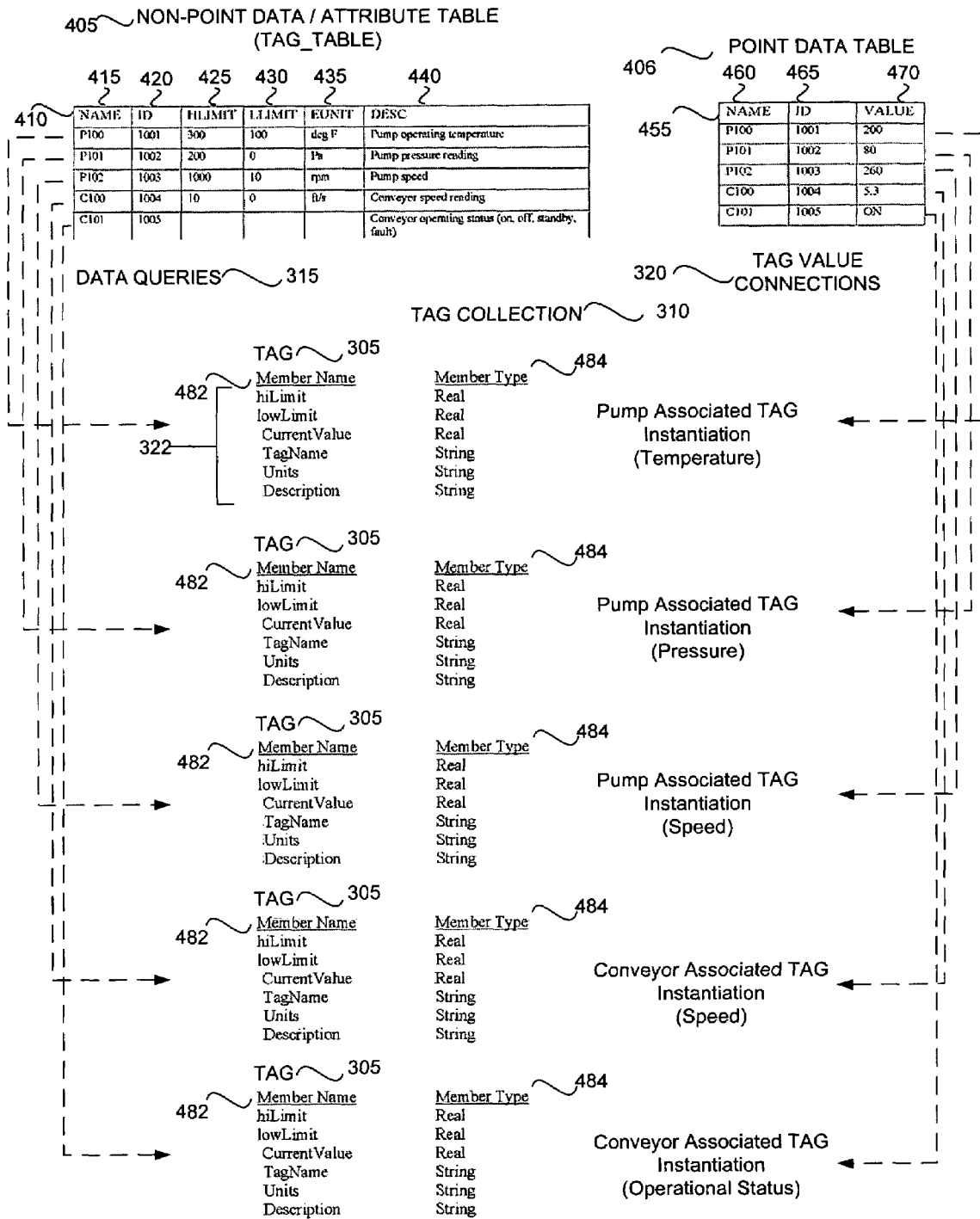

The exemplary tag collection 310, tags 305, and tag component members 322 shown in FIG. 4A depict the mapping of information from the point data database 406 and non-point data database 405. As previously indicated the tag collection 310 comprises a grouping of Tags or tag instances 305 representing data structures used for acquisition and association of point data 110 and non-point data 112. In various embodiments, the tag collection 310 comprises instantiations of previously defined tag components represented by the one or more tag instances 305. Each tag instance 305 comprises tag component members 322 that may further comprise a member name 482 and an associated member type 484. The member type 484 defines the expected data types of the various tag component members 322 for each tag instance 305, for example as real or string values.

The tag collection 310 may be constructed as a plurality of instantiations of a singular tag component definition or may utilize more than one tag component definition. In general, the tag component definition provides a logical framework for associating point data 110 and non-point data 112 in a user-selectable/configurable manner. In one aspect, the tag component definition is constructed in such a manner so as to allow it to be used in a variety of different contexts without being constrained to a particular point data/non-point data association. In certain implementations, a singular tag component definition may be sufficient to accommodate a number of different point data and non-point data associations through one or more instantiations contained within the tag collection 310.

In one aspect, tag component members 322 of the tag collection 310 may be mapped to selected information contained in the point data and non-point data databases 405, 406 using the aforementioned data query 315/tag value connection 320 approach. This is shown at a high level in FIG. 4A where selected information reflecting particular point data sources 208 contained in fields 410 of the point data and non-point data databases 405, 406 is mapped to corresponding component members 322 populating them with the appropriate values or information.

In one aspect, population of the component members 322 using the data query approach is facilitated by simplified query language. The simplified query language may take the form of a query such as "SELECT NAME, HLIMIT, LLIMIT, EUNIT, DESC FROM TAG_TABLE". The aforementioned simplified query may be translated by the application environment 120 to one or more suitable database queries (for example in SQL) that may be used to extract information from the non-point data table 405. The form of the simplified query provides a more intuitive understanding of the operations to be performed in mapping the information without having detailed knowledge of the underlying operations themselves.

FIG. 4B further illustrates an exemplary mapping between the non-point data database 405 and the exemplary tag collection 310 shown in FIG. 4A. The aforementioned query may be resolved, in part, by interpreting the language of the query resolving field names 410 from the non-point data database 405 and identifying a member name 482 associated with a particular component member 322. For example, in the language of the query: NAME, HLIIMIT, LLIMIT, EUINT, and DESC reflect fields of the non-point data database 405 that may be mapped to appropriate member names 482 associated with particular component members 322 for tags 305 within the tag collection 310. Information may thus be extracted from the non-point data database 405 and used to populate the TagName, hiLimit, lowLimit, Units, and Description component members 322 of the appropriate Tag 305.

Population of point data 110, which may be updated more frequently, may proceed in a similar manner wherein a mapping functionality is used to associate fields 455 contained in the point data database 406 with selected component members 322 for appropriate tags 305 in the tag collection 310. FIG. 4C, illustrates an exemplary point data access/association 485 for a selected component member 322 associated with a particular tag 305 of the tag collection 310 corresponding to "Current Value" 486 for which a point data connection may be desirably made. The tag member "CurrentValue" 486 may be desirably populated with point data 110 extracted from a selected back-end tag system or point data source 208 specified as a connection group 488 (PHD in this example). As previously indicated, the point data information 110 may be acquired from the point table 406 using a tag value connection 320 or extracted/sampled directly from the appropriate point data source 208. In each instance, the corresponding point data 110 is desirably accessed from the specified location with a desired refresh rate and stored in the appropriate component member 322 (Current Value in this example).

As described above, tag value connections 320 and data queries 315 may be used to "populate" selected tag component members 322 with desired information from point data and non-point data sources. In various embodiments, query results from data queries 315 are used in a selected tag instance 305 to fill in the parameters or information associated with the tag value connection(s) defined for the tag 305. An efficient mechanism for implementing data query information retrieval is to have a single query 315 perform the operations necessary to return non-point data associated information for a plurality of tag instances 305. Such a configuration improves resource utilization and reduces overhead associated with executing multiple data queries to achieve similar results.

The tag value connections 320 may be associated with the point data members 322 in a singular manner such that a specific tag value connection 320 is associated with a selected point data member 322 of a selected tag instance 305. Here the tag value connection 320 may be used to define a "formula" or mechanism by which to utilize the non-point data 112 for a selected tag instance 305 in addition to other configuration information associated with the tag value connection 320 to retrieve and populate the point data 110 for each tag 305.

In one aspect, as shown in FIG. 4C, forming a tag value connection 320 comprises specifying the NAME or ID 490 of the tag 305 associated with the point data table 406 or point data source 208 to identify the information to acquire and the desired field/information 492 to be extracted (e.g. VALUE). A simplified referencing mechanism for associating a component member 322 to store extracted point data 110 with the relevant point data 110 to be extracted from the table 406 or point data source 208 may comprise: Specifying the Tagname identifier (e.g. "% TagName") 490 along with the request to establish a connection 486 with a corresponding connection group (e.g. "PHD") 488 to populate a selected component member with point data 110 corresponding to the selected field (e.g. "VALUE") 492. Here, the Tagname identifier "% TagName" indicates that the request to populate the component member 322 of the Tag 305 will use this Tag's name field (e.g. "% TagName") at runtime and pass this information to the appropriate back-end data source or connection group (e.g. "PHD") 488 where the associated information contained in the selected field (e.g. "VALUE") 492 will be sufficient to uniquely identify the desired value to be accessed.

FIG. 4D illustrates an exemplary joined table or collection 494 of point data 110 and non-point data 112 that may be formed by applying the aforementioned data access principles to acquire data from the point data table 406 and non-point data table 405. One desirable feature of forming such a joined table or collection 494 is that each Tag 305 and its constituent components 322 may be represented and available as an independent object with the benefits and display capabilities of an object. Thus, each Tag 305 associated with the joined table 494 may be represented as an object having any number of class-based views available to display the content (e.g. component members 322) of the Tag 305. Construction and presentation of data in this manner therefore improves the functional capabilities of a data acquisition system by allowing the merging of point data 110 and non-point data 112 in a single coherent table or view. Additionally, the joined data is made more accessible by providing means to conveniently relate data types that are normally not readily combinable using conventional systems.

As will be appreciated from the aforementioned description, different data acquisition strategies (e.g. structured queries/tag value connections), as well as, different data acquisition times/retrieval intervals may be implemented to populate the various fields (e.g. component members 322) relating to one of more Tags 305 described by the joined table 494. One desirable benefit provided by ordering the information in such a manner is that a portion or the substantial entirety of non-point data 112 may be identified and acquired by as little as a single structured query 315 thus significantly reducing computational load, programmatic complexity, and communications bandwidth.

Figure 4E:
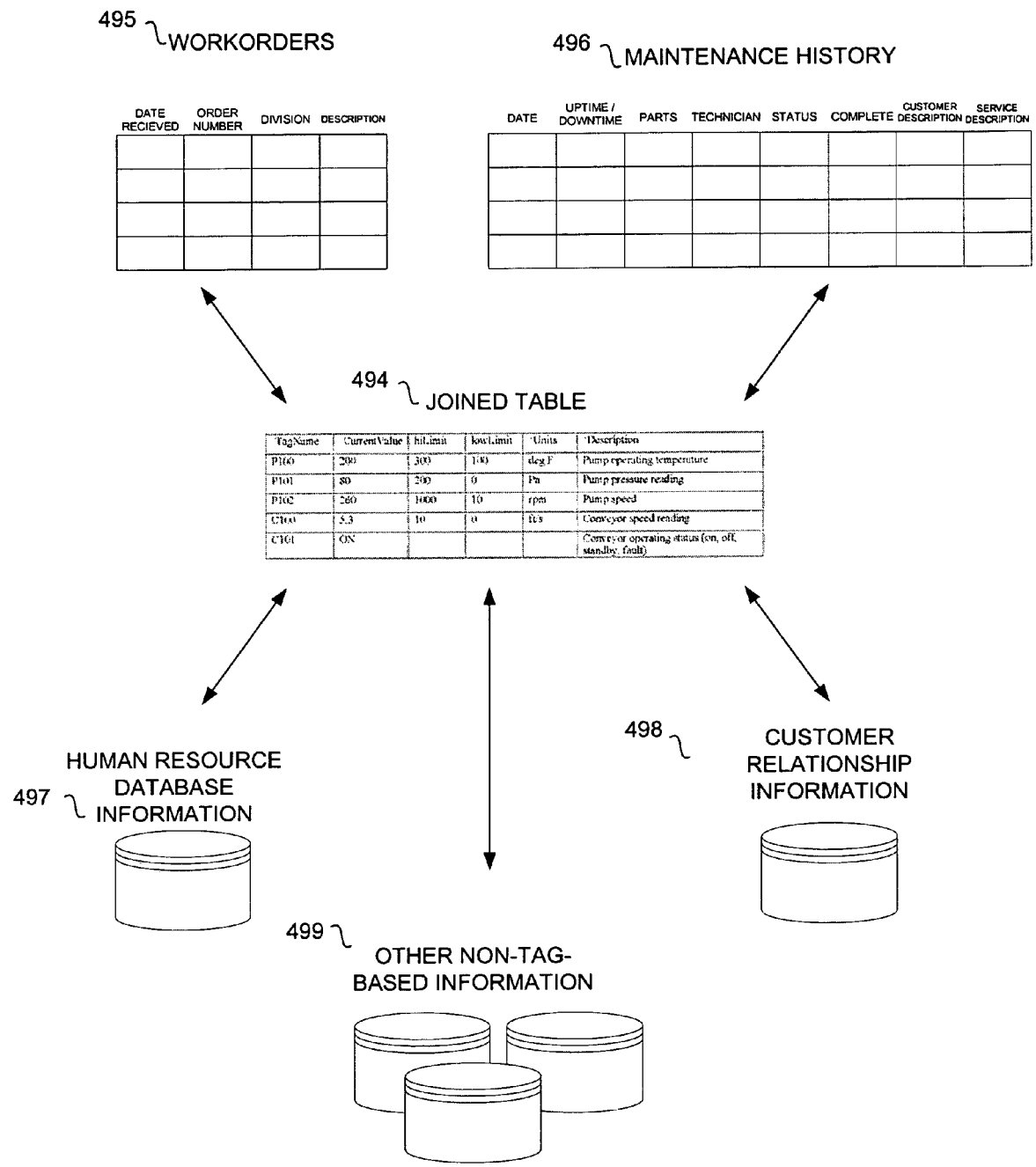
FIG. 4E illustrates examples of the integration of tag-based point data/non-point data and non-tag-based non-point data within the system of the present teachings.

In various embodiments, the joined table 494 comprising tag-based point data 110 and non-point data 112 desirably provides a mechanism by which to unite tag-based information with non-tag based information. As previously indicated, conventional systems lack the ability or are significantly limited in their ability to integrally manage tag-based data and non-tag-based data. In one aspect, the joining of tag-based point and non-point data 110, 112 in the joined table 494 overcomes this limitation providing the tag-based data in a form/format that may be conveniently associated with non-tag based information as shown in FIG. 4E.

Tag-based point data and non-point data in the joined table 494 may be presented/stored in a form that is compatible with other conventional non-tag-based non-point data sources. For example, workorder schedules 495 and maintenance history tables/records 496 that may be associated with non-tag-based back end data sources/systems may be stored as records in conventional databases/applications. It will be appreciated by those of skill in the art that information arising from these sources may be readily associated with the tag-based information following integration in the joined table 494 due in part to the similarity in structure or organization of the data.

Broad and disparate classes of other non-tag-based data sources may be integrated with the tag-based information contained within the joined table 494. Such information may include that found in human resource databases 497, customer relationship databases 498, and other sources of non-tag-based information 499. It will be appreciated that a wide variety of different sources of non-tag-based non-point data exist and such information may be desirably related to tag-based point and non-point data through application of the present teachings.

In various embodiments, the present teachings contextualize tag-based information in a manner that allows it to be integrated with non-tag-based information without requiring significant modification or re-configuration of the non-tag-based information. Consequently, tag-based information and non-tag-based information may be operated upon in the application environment in a joint manner and desirably configured for integrated use. One aspect of such integration is the ability to provide combined "views" representative of tag-based and non-tag-based information within the same visual context. As will be described in greater detail below creation of such views is significantly enhanced by the ability to "treat" tag-based data and non-tag-based data in similar manners with respect to "view" design. Furthermore, the present teachings allow tag-based data and non-tag-based data to be utilized within the same data structures providing for improved class-based component development.

Figure 5A:
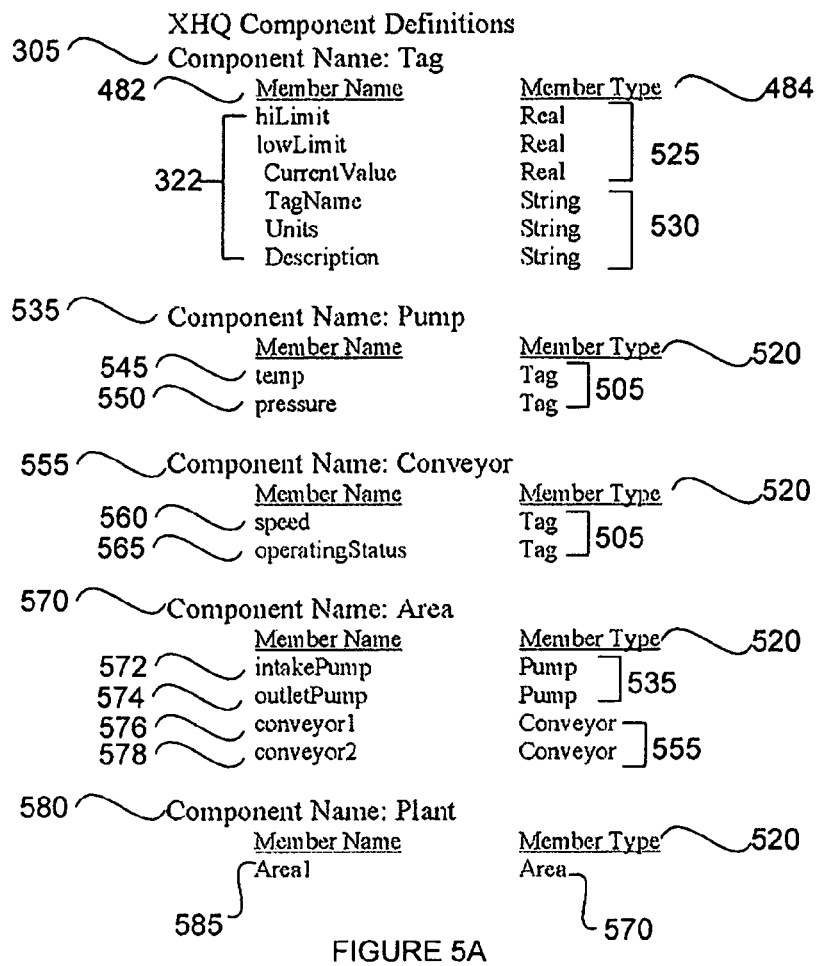
FIGS. 5A-B illustrate exemplary component definitions associated with point data and non-point data groupings representative of logical constructs within the system.
Figure 5B:
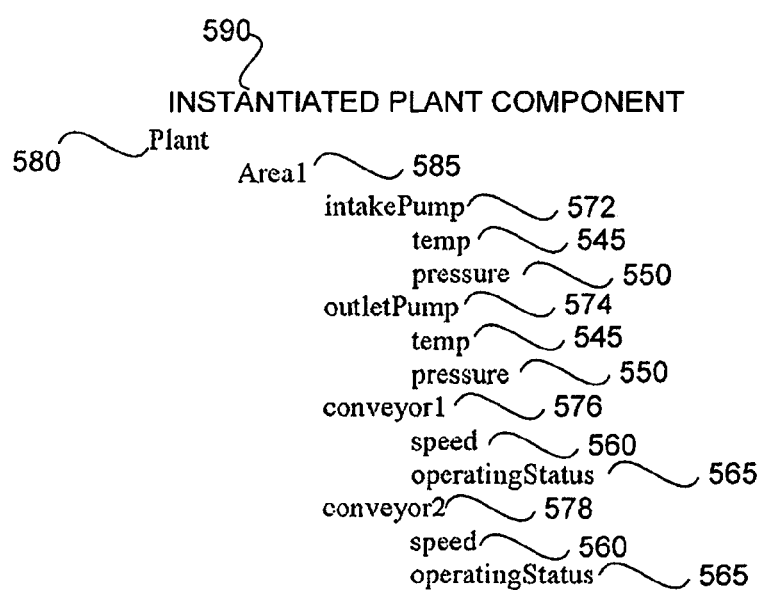

FIGS. 5A-B illustrate how Tags 305 may be used in a hierarchical and/or object-oriented (i.e. modeled) manner and built upon to organize increasingly complex systems having multiple point data 110 and non-point data 112 groupings representative of logical constructs within the system. In one aspect, use of Tags 305 in the aforementioned manner provided a convenient mechanism to convey a class-based or object oriented structure to a system having many potential data sources that are to be monitored, visualized, and grouped. In the exemplary system, a base component Tag 305 is defined to represent the foundational element joining selected point data 110 and non-point data 120. As described previously the Tag 305 comprises various component members 322 used to store and access point data 110 (e.g. Current Value) and non-point data 112 (e.g. hiLimit, lowLimit, TagName, Units, and Description).

Each component member 322 may further have an associated member name 472 and member type 484 delineating accessibility and constraints upon the data contained within the component member 322. In one aspect, the member type 484 indicates an inheritance property, composition, grouping, or restriction associated with a selected component 322. For example, the member types for Tag 305 comprise expected forms of the data being of type real 525 (associated with hiLimit, lowLimit, and Current Value) and of type string 530 (associated with Tag Name, Units, and Description). The member type may further be used to specify other logical constructions such as type Tag and higher level-components/collections to provide a mechanism for class-based modeling as will be described in greater detail below.

A higher-level Pump component 535 illustrates how Tags 305 may be utilized and reused in the definition of other logical components or informational groupings. For example, the exemplary Pump component 535 contains and, therefore, instantiates Tags 305 comprising a Temperature-associated Tag 545 and a Pressure-associated Tag 550. Each of these Tags 545, 550 are indicated by the member type "Tag" 505 delineating separate Tag instances of the exemplary Pump component. This manner of component definition is highly efficient as it reuses the base component Tag 305 and allows associations to be formed with diverse and complex logical groups without having to explicitly define each of the component members within a selected higher-level group. Thus, association of the Temperature-associated Tag 545 and Pressure-associated Tag 550 with the member type "Tag" 505 allows the characteristics and definitions for the Tag component 505 to be automatically inherited/instantiated by the temperature and pressure component members of the Pump component 535 using a single association.

In various embodiments, components and logical groupings may be defined in several ways. In one aspect, a selected component may be constructed by explicitly indicating each point data 110 and non-point data 112 component member association to be included in the component definition. This approach is useful in defining low-level Tag components where each component member 322 within the Tag component 305 is explicitly associated with a point data 110 or non-point data 112 source. Conversely, component definition may also be accomplished wherein existing components may be used to "build" new components which comprise or instantiate one or more previously defined components or Tags, thereby inheriting by containment the characteristics of these previously defined components. In various embodiments, component definition according to the aforementioned manner provides a mechanism by which to reuse existing components and Tag definitions to thereby facilitate development of Tag collections that may be used to model large numbers of point data 110 and non-point data sources 112.

In one aspect, the reusability of components is particularly useful when defining multiple instances of objects, devices, apparatuses, etc. For example, when defining multiple pump component instances, it is not necessary to explicitly enumerate each component member. Instead, a selected component may be defined by associating or inheriting from a previously defined component or Tag having the requisite component members embedded within the component definition.

In certain embodiments, component definitions may be constructed using combined approaches wherein the associations of components, containing components, and sub-components are explicitly defined as illustrated in FIGS. 5A-B and, alternatively, where the usage of contained and related components does not require the explicit definition of all intervening component relationships (e.g. the Tags related or belonging to the Area component 570 can be accessed by either defining the explicit relationship between every component Area 570, Pump 535, Conveyor 555, and Tags 305, or, alternatively by defining a general relationship of many Tags 305 belonging to the Area component 570 and providing a means for appropriately referencing an individual Tag 305 as needed). This flexibility in component design further enhances the developer's ability to create increasingly complex components within the system with reduced effort.

Functionality may be provided for "masking" portions of selected component definitions such that only the unmasked portions are actively utilized or displayed. Thus, a mask of the unnecessary component members of a first component that has one or more component members that are not required for construction of a second component may be performed to leave only the unmasked component members that may be used in the construction of the second component. This approach simplifies component construction and avoids confusion when incorporating undesirable/unnecessary component members in components derived from other components.

Referring again to FIG. 5A, a Conveyor component 555 may be defined reusing the same or similar structural definition for a Tag 305 as the Pump component 535. The Conveyor component 555 may relate these Tags 305 to different sources of point data 110 and non-point data 112 as previously described however, the underlying component members 322 for each Tag 305 possess similar logical constructions. Thus, defining a Speed Tag 560 and Operating Status Tag 565 associated with the Conveyor component 555 may be accomplished using substantially the same Tag 305 component definition as was used in defining the Pump component tags of Temp 545 and Pressure 550.

Building upon the component definitions for the Pump component 535 and the Conveyor component 555, an Area component 570 may be defined by an intake Pump 572 and outlet Pump 574 having a member type Pump 535. Likewise, a first conveyor component 576 and a second conveyor component 578 may be defined using member type Conveyor 555. It will be appreciated that the Area component 570 with a moderate to large number of high-level components (e.g. Pumps and Conveyors and similar components numbering in only the 10s to 20s) and possibly even greater levels of depth of complexity could in total (i.e. counting all the Tags contained by the Area component and any of its sub-components) contain a relatively large number of Tags 305 and or component members 322 that would have to be individually defined for the Area component 570. However, by applying a hierarchical class-based component definition approach the many Tag instances associated with an Area component 570 can be readily defined and managed by incorporating higher level component definitions (e.g. Pump and Conveyor) that define their own sub-component and Tag associations as compared to explicitly defining each Tag component member as immediate members of the Area component 570.

In one aspect, component definition in this manner is more intuitive to the user/developer who can design more complex components using previously defined components as "building blocks". Thus, rather than having to identify each low-level Tag associated with a complex system, a representation of the modeled system and associated views can be constructed based on high level component design wherein the appropriate Tags 305 are automatically inherited/instantiated by virtue of the underlying component definitions.

As an example of how high level component definition and reusability operates, a Plant component 580 may be defined as a single Area1 component 585 whose member type 520 is Area 570. Through this relatively simple component definition, all of the underlying components 570, 555, 535 and Tags 305 associated with the various lower level components are automatically instantiated when the Plant component 580 is instantiated, thereby, generating a representation of a complex "plant" through the relatively little effort required to define the appropriate component members associated with the Plant component 580.

FIG. 5B illustrates a resulting component solution 590 for the Plant component 580 based on the above-described components 580, 570, 555, 535 and Tags 305 associated with FIG. 5A. In one aspect, the Plant solution 590 is displayed in a tree or hierarchical format which facilitates visualization and understanding of the relationships and patterns of inheritance/instantiations for the various components of the solution 590. As shown, the Plant component 580 comprises the Area1 component 585 which further comprises the intakePump 572, outlet Pump 574, conveyor1 576, and conveyor2 578 components. The pump components 572, 574 further comprise temp 545 and pressure 550 components and the conveyor components 576, 578 further comprise speed 560 and operatingstatus 565 components. Each of the temp 545, pressure 550, speed 560, operatingstatus 565 components are Tags 305 of similar form inheriting/instantiating underlying Tag members 322; hiLimit, lowLimit, CurrentValue, TagName, Units, and Description.

Figure 5C:
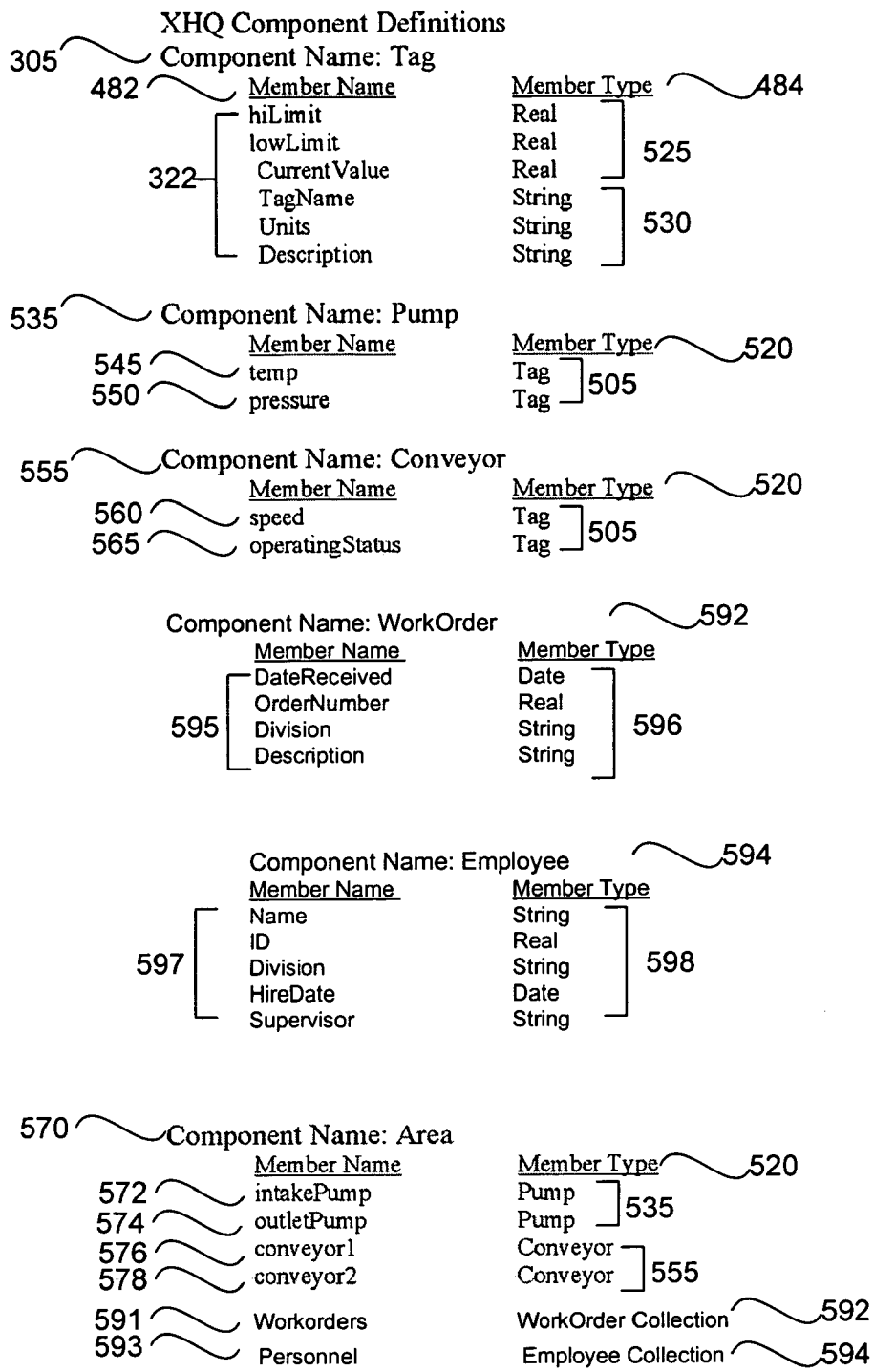
FIG. 5C illustrates exemplary component definitions associated with tag-based point data/non-point data and non-tag-based non-point data groupings representative of logical constructs within the system.

FIG. 5C extends the use of tag/component definitions to include tag-based information as well as non-tag based information. In one aspect, tag-based point data and non-point data may be combined with non-tag-based point data in similar hierarchical and/or object-oriented (i.e. modeled) manners as described above in FIGS. 5A-B. For example, the high level area component 570 may be configured to include both tag-based information relating to pump and conveyor components 535, 555 as well as non-tag based information such as work order information 591 and personnel information 593.

Integration of non-tag-based information into a component may be accomplished in a similar manner as described above wherein the member type 520 of the area component 570 specifies lower level components 592, 594 that define non-tag-based non-point data relations. For example, the WorkOrder collection 592 may comprise various non-tag-based non-point data references 595 (e.g. description, service number, division, submit date, expected completion date, etc) having associated members types 596 (e.g. string, real, date, etc). These non-tag-based components 592, 594 may be utilized in a similar manner as tag-based components and configured through appropriate referencing and acquisition of data associated with non-tag-based data sources such as the aforementioned workorder data sources 495, maintenance history data sources 496, human resource database 497, customer relationship database 498, and other non-tag-based data sources 499.

Like the mechanisms for tag-based component definition, the mechanisms for non-tag-based component definition provide a convenient mechanism to convey a class-based or object oriented structure to a system having many potential data sources that are to be monitored, visualized, and grouped. It is conceived that a further extension of such implementations are the development and use of hybrid components that contain both tag-based information and non-tag based information. Taken together these various manners of component definition provide for highly-flexible methods of associating data of various types/classes.

Figure 6A:
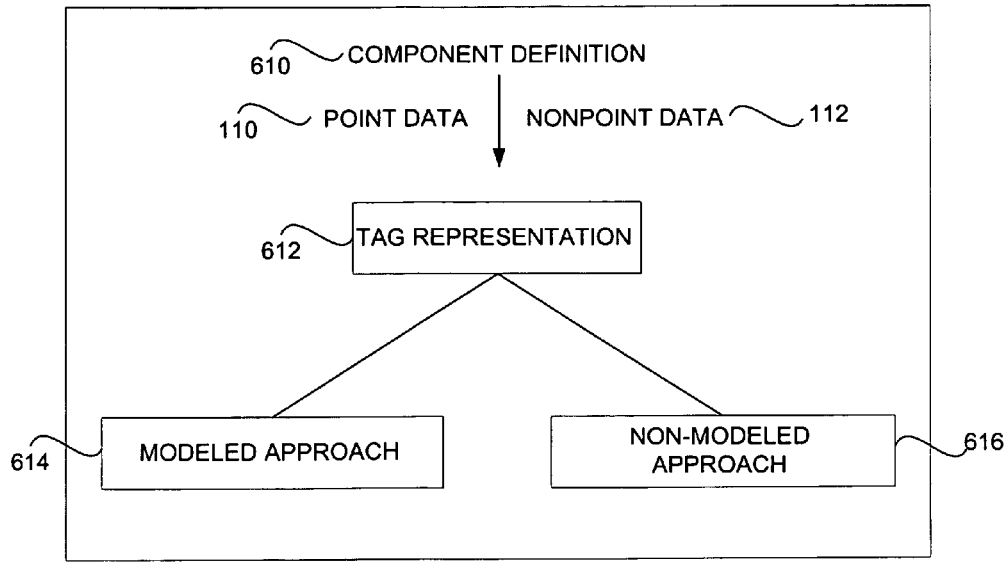
FIG. 6A illustrates a high level diagram distinguishing modeled and non-modeled approaches to tag/component definition.
Figure 6B:
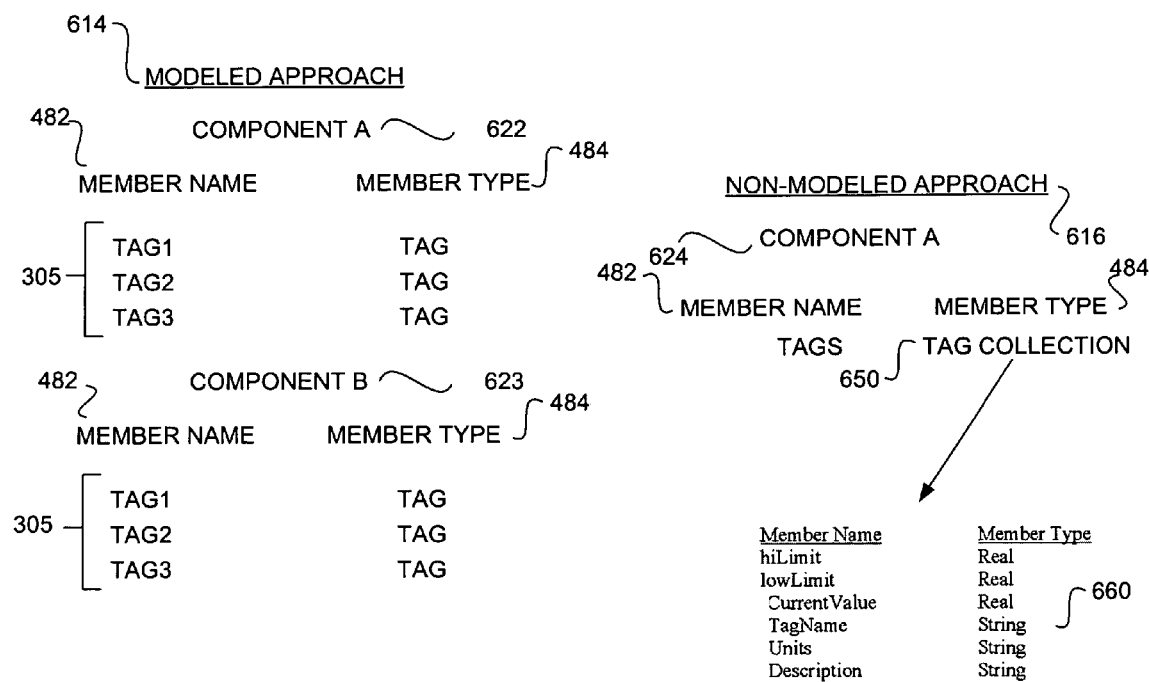
FIG. 6B illustrates exemplary modeled and non-modeled approaches to tag/component definition.

FIGS. 6A-B illustrate high level diagrams distinguishing two approaches that may be used in the acquisition and association of point data 110 and non-point data 112. It will be appreciated that these approaches are not necessarily exclusive of one another and may be combined as desired to achieve various functionalities as will be described in greater detail below. As previously described, association of point data 110 and non-point data 112 from various sources may be used in the representation of logical and physical components of a system to be monitored. These representations may further expressed by way of tag or component definitions and associations.

As shown in FIG. 6A, a component definition 610 may be used to represent a data structure that sets forth and groups selected point data 110 and non-point data 112 for one or more logical and/or physical components of a system. For example, component definitions 610 may be devised for low-level, relatively simple entities within a system such as dials, gauges, readouts, counters, etc. Similarly, component definitions 610 may be devised for higher-level components including by way of example, pumps, conveyors, areas, and plants. Higher-level components may further be represented by various combinations and/or groupings of lower-level components; defined by explicit references to the underlying point data and non-point data connections; or combinations thereof.

In various embodiments, component definition 610 of a tag representation 612 may be used with either a modeled 614 and non-modeled approach 616 (or a combination thereof). The choice of which approach to use may depend upon various factors including but not limited to: user preferences, system complexity, existing sources/availability of information, etc. Additionally, use of modeled or non-modeled approaches 614, 616 may depend in part upon the type or characteristics of the component being defined. For certain components and configurations one approach may provide beneficial capabilities and functionality over the other and as a consequence may be preferentially used. One rationale for providing a dual approach is to improve flexibility and customizability in the data collection system thereby improving the efficiency with which selected data aggregation, data retrieval, and data presentation tasks may be performed.

In the modeled approach 614 tags and components (previously exemplified by instantiated elements 305, 535, 555, 570, and 580) are explicitly defined and associated with the selected component definition 610. Thus as shown in FIG. 6B, the modeled approach 614 to tag representation 612 for exemplary components 622, 623 (Component A, B) may comprise invoking one or more tag instances (Tag1, Tag2, Tag3, etc.) 305 each of which is associated with selected point data 110 or non-point data 112 within the system that relates to the exemplary components 622, 623.

In the modeled approach 614, multiple components 622, 623 of the same category or class may be defined based on discrete instantiations of the tag instances 305 in the component definition 610. In one aspect, the tag instances 305 may be configured with pre-defined non-point data associations (e.g. default associations) that may be common for each tag instance 305. For example, attributes such as units, ranges, limits, etc. may be acquired by default upon instantiation of the tag 305 without having to configure each tag component member 322 individually. It will be appreciated that such a configuration helps to eliminate having to create redundant non-point data associations that might otherwise have to be configured individually. Such a benefit may become increasingly significant as the size of the system to be monitored increases.

In addition to the use of default non-point data associations, the tag component members 322 of each tag instance 305 may also be configured individually as needed or desired. For example, point data associations may be defined for each tag instance 305 such that a selected tag instance 305 may be associated with one or more point data sources thereby relating the selected tag instance 305 to particularized or relevant point data 110. Thus, during the tag instantiation process, virtually any addressable point or attribute within the system may be configured to be associated with selected tag component members 322.

As previously described, another benefit to the modeled approach 614 is to provide a structured or class-based development mechanism to represent component definitions. The class-based approach allows increasingly complex components to be "built" from other previously defined components. Such an approach facilitates organization and grouping of tags 305 and may be used to form logical associations between tags 305 and point data/non-point data sources. Furthermore, modeling of component definitions 610 allows customizable "views" to be created which may be based in part on the hierarchical ordering of tags and components.

Additional information related to the implementation of "views" within the context of a data acquisition system may be found in XHQ application documentation/manuals including the XHQ User Guide, the XHQ Administrator Guide, and the XHQ Connection Guide. Further details may also be obtained from commonly assigned patents and patent applications including: U.S. patent application Ser. No. 10/726,430 entitled Modeling system for retrieving and displaying data from multiple sources; U.S. patent application Ser. No. 60/526,891 entitled System and Methods for Retrieval, Presentation, and Synchronization of Real-Time Points/Tags within a Class-Based Component and View Model; U.S. patent application Ser. No. 09/704,471 entitled System and method for retrieving and presenting data using class-based component and view model; and U.S. patent application Ser. No. 60/162,975 entitled System to Provide Real Time Information Portal Using Class-Based Component and View Model.

As noted above, components definitions 610 may also be represented using the non-modeled approach 616. The non-modeled approach 616 differs from the modeled approach 614 in that explicit definition/invocation of instantiations of tags for each instance of a component member is not used. In the non-modeled approach 616, a tag collection 650 may instead be defined which comprises one or more tags 305 with each tag comprising members 660 (i.e. the tag's component definition—equivalent to the tag definition 305 in FIG. 5A used in the modeled approach). The tag collection 650 obtains its tags 305 through the methods described that created the tag collection 310 in FIG. 4A. Therefore, the tags within the tag collection 310, 650 are not instantiated on a component by component basis (or tag by tag basis) as in the modeled approach 614. The tags 305 within the tag collection 310, 650 may be accessed/referenced by various mechanisms as will be described in greater detail below. In one aspect, the non-modeled approach 616 may be used to develop a tag collection 650 where any of its tags 305 may be associated with a tag member of a modeled component as in component definitions 622, 623.

In certain implementations, it may be desirable to utilize the non-modeled approach 616 during component definition 610 when the class-based organization of the modeled approach 614 is not readily needed or desired. For example, use of the non-modeled approach 616 may be preferential for very large tag-based systems where the reusable sub-components that would contain the individual tags are not useful in themselves or where the display of tags in many views at a higher-level such as an area or plant is more important than the association of each tag to a lower-level component that contains each tag. In such systems, imposition of a class-based organizational scheme for associating point data 110 and non-point data 112 may be less of a concern and sufficient organizational simplicity and accessibility may be preserved through the use of a tag collection. Additionally, it is conceived that data acquisition systems may be developed which have a hybrid character in which modeled and non-modeled approaches 614, 616 are used together so as to capitalize on the features and benefits of both. For example, various components of a system may include both modeled tag instances as well as non-modeled tags organized within tag collections.

In one aspect, the tag collection comprises a set of tags that can be identified and associated with various point data 210 and non-point data 212 within the system or back-end data system 217, data acquisition system 215, or point data source 208 within the back-end environment 100. The non-modeled approach 616 differs from the modeled approach 614 by allowing a multiplicity of tags to be represented as a tag collection that is "populated" with tags 305 through the techniques described in creating the "joined" table 494 in FIG. 4D. These tags 305 would otherwise require explicit definition as in the modeled approach 715.

Using the aforementioned tag and component development approaches 614, 616, a system may be developed to acquire point data 110 and non-point data in an efficient, flexible, and relatively straightforward manner. Examples of systems that may benefit from the manner of data organization of the present teachings include, but are not limited to: control systems, SCADA systems, plant data historians or other generic data acquisition systems primarily involving the monitoring, collection, control, and reporting of tag data sources (i.e. systems containing both point and non-point aspects for tag data), point data sources, and the combination of tag data sources, point data sources, and non-tag data sources such as business applications, general purpose databases, and other sources of data relating to the operation of a business that is not tag-based in nature. In general, solutions provided by the various embodiments of the invention allow sufficient attributes and information to be associated with selected point data sources and tag data sources and provide mechanisms for the storage and management of information for use in control, monitoring, reporting and other automation system and business system uses.

FIGS. 7A-C and their associated descriptions further characterize the modeled and non-modeled approaches 614, 616 described above. In one aspect, either the modeled or non-modeled approaches 614, 616 may be used to craft data organization, access, and presentation solutions to achieve similar results. In the development of data visualizations for tags/components alone or with other non-tag data, providing the ability to mix and match the non-modeled and modeled approaches 614, 616 represents a significant advantage over conventional systems. Thus in various embodiments of the present teachings, the benefits and strengths of either or both approaches 614, 616 may be capitalized upon as desired.

As previously discussed, situations may be encountered where the non-modeled approach 616 may be beneficially or desirably implemented over the modeled approach 614. For example, smaller systems or systems with many unique (non-redundant/non-similarly defined) components may give rise to considerations of reduced complexity and administrative overhead when designing point data 110 and non-point data 112 acquisition schemas. Whereas complex systems having multiple components of redundant or similar character may benefit from implementation of the modeled approach 614 through aspects of component reuse, use of the non-modeled approach 616 in smaller systems, systems with no or limited benefit of explicit modeling of the non-tag components of the system, or systems with many unique components may give comparable or improved results in terms of reduced organizational complexity and ease of development.

Using the tag component definition 305 previously described in connection with FIGS. 5A-B, FIG. 7A illustrates an exemplary view (e.g. Value view) 705 that may be constructed to display information that corresponds to point data 110 representative of current values for an individual tag associated with any given pump and non-point data 112 that corresponds to units for the point data 110 related to the pumps (e.g. IntakePump/OutletPump) within Area1 585.

In one aspect, the term "view" describes a visualization for selected point data 110 and/or non-point data 112 representing a logical or physical component within the system. Views may be constructed to bring together data and information in a manner that may be more readily/easily interpreted. Views may also provide the ability to convey the class-based nature or organization of components within the system. In various implementations, views may be configured as reusable elements to allow the display of information for various tags and components within the system. The reusable aspect of these views desirably conveys a degree of flexibility to the data acquisition and monitoring system and reduces development time in constructing multiple/complex system views. It will be appreciated that the exemplary views and methods for constructing them may be adapted for use in creating numerous different view representations and as such the exemplary views described herein should not be interpreted as limiting upon the scope of the invention.

In one aspect, the exemplary Value view 705 is configured to display the tag component members corresponding to CurrentValue 710 and Units 712 for a selected tag/tag instance 305. It will be appreciated that such a view 705 might be used in connection with an application configured to display such items for a user. In the below-described description the exemplary view 705 will be implemented in the context of both the modeled and non-modeled approaches 614, 616.

The Value view 705 further comprises two view elements 720, 722. The first view element 720 may be representative of a point data view element where the actual value for the point data 110 (e.g. CurrentValue) referenced/acquired by the view 705 is presented. The indicated value "1.234" shown further represents a placeholder for the point data value associated with the tag component member CurrentValue 710 (e.g. a "real" type value). It will be appreciated that the information contained within this view element 720 may change at runtime in accordance with the point data 110 associated with CurrentValue 710.

In a similar manner the second view element 722 may be representative of a non-point data view element where the actual value for the non-point data 112 (e.g. Units) referenced/acquired within the view 705 is presented. The indicated value "ABCD" shown further represents a placeholder for the non-point data value associated with the tag component member Units 712 (e.g. a "string" type value). As above, it will be appreciated that the information contained within this view element 722 may change at runtime in accordance with the non-point data 112 associated with the Units tag component member 712.

According to one implementation of the modeled approach 614, a view for a high-level component (e.g. Area component) may be developed based on views created for low-level or intermediate-level components that make up the higher level component (e.g. conveyors, pumps, tags, etc.). Hierarchical or inherited component development in this manner provides a mechanism to display the details of the low-level and intermediate-level components/tags within the high-level component. In the illustrated example, Area1 585 has been instantiated as shown in FIG. 5B. Area1 585 therefore is representative of an instance of the high-level component Area 570 and comprises/contains modeled instantiations of the low-level/intermediate-level components contained within the Area component 570 and the underlying components /tags contained within each of these components as illustrated in FIG. 5B.

According to the modeled approach 614, views may be developed for each of the components to display the information associated with the tags 305 for the lower level components (e.g. pumps) that make up the higher level components (e.g. Area). The illustrated examples contained herein depict an exemplary view for the lower level Pump component and the resulting selected view for the high level Area component that is configured to display the associated tag values.

As shown in FIG. 7B a pump component value view 730 may be developed for a Pump component. In the illustrated view 730, selected tag-associated point data 110 and non-point data 112 from the Pump component is configured to be displayed. Thus, a first value view 705 may be "embedded" within the pump component value view 730 representative of the temp tag 545 and a second value view 705 may be "embedded" within the pump component value view 730 representative of the pressure Tag 550. Embedding the value views associated with each of the pump component members therefore provides a mechanism to display point data 110 and non-point data 112 associated with any given or selected instance of the Pump component 535.

It will be appreciated that this view 730 can be configured to display the tag values (point data 110/non-point data 112) for one or more selected pump component instances for which, according to FIG. 5B, there are two such pump instances. While the aforementioned example shows the display of both tags of the Pump component it will be appreciated that the information in this and other views may be modified/configured as desired. For example, in a system having many similar components, selected components can be configured for display as a collection or group. Similarly, the point data 110/non-point data 112 display in connection with each component can be individually configured/customized according to user preferences. Additionally, different configurations of views (e.g. value views) may be assigned to similar component types as desired.

As shown in FIG. 7C, a high-level component corresponding to an Area Component Pump View 740 may be devised as a representative view for the Area component 570. Constructed according to the modeled approach 614, this view 740 may be developed through the inclusion of a first and second pump component value view 730 corresponding to the intake Pump and outlet Pump of the area component 570. Thus this view 740 depicts each of the pumps (e.g. Intake Pump/Outlet Pump) within the Area1 component. In one aspect, in addition to inclusion of the of the pump component value views 730 additional information may be included within the Area Component Pump View 740 such as textual attributes/labels 750 used to differentiate the embedded pump components from one other.

Modeling of components and views in the aforementioned manner provides a useful and flexible mechanism by which to define relationships for integration of point data 110 and non-point data 112. Furthermore, increasingly complex components/views can be built upon previous work thereby reducing redundant operations and tasks. Additionally, components/views that are physically distinct from one another in terms of their content or makeup (e.g. pump vs conveyor) may be found to share a significant degree of commonality (e.g. similar data collection/presentation requirements) which can be capitalized upon through component/view reuse in the aforementioned manner. Furthermore, as previously described, components/views may be configured to selectively acquire/present/combine data in distinctive manners as desired.

In certain embodiments, the modeled approach 614 described above may be implemented by establishing a connection between each of the tags/components (or more specifically selected tag component members) to an appropriate informational source (e.g. point data from a point data source or table 406/non-point data from a non-point data source or table 405) associated with the tag collection. For example, each of the tags component members 322 associated with each of the instantiated tags may be linked with the appropriate back-end data sources for example through appropriate identifiers or keys 415, 460. In the case described above for the area component pump view 740, configuring the connections for an instance of the area component to a "record" found in the point data table 406/non-point data table 405 in the tag collection may be accomplished through the use of "configuration" sequences 760 for each tag instance 305 represented as a Tag value view 705 contained within the area component pump view 740 (of which there would be 4 in the illustrated example). In the case of configuring connections for each tag instance 305 represented as a tag value view instance 705, individual tag component members 322 used to acquire point data (e.g. CurrentValue) 110 and non-point data (e.g. Units) 112 may be accomplished using "configuration" sequences 770 in a similar manner (of which there would be 8 in the illustrated example). The aforementioned configuration sequences may comprise command structures recognized by the data acquisition system for retrieving point data 110 and non-point data in a manner similar to that previously described in connection with FIGS. 4A-D.

In one aspect, an exemplary configuration sequence for the selected tag instances may comprise connecting the CurrentValue member and the Units member for each tag. Since the aforementioned members are the only members used in this example only these members would be configured. However, it will be appreciated from this example that one might typically configure each of the members 322 of a tag 305.

An exemplary sequence for each member might comprise specifying a back-end system or connection group which identifies the back-end system and specifying the tag in the back-end system, for example, by specifying the tagname or tag ID that associates the tag in this system with the tag in the back-end system. Thereafter, an "attribute" of interest may be specified (e.g. Value, Units, HiLimit, etc.). Typically, connectivity to various back-end systems provides some mechanism to identify which point or non-point data for the tag is desired.

In one aspect, for increasingly complex components/views implemented under the modeled approach 614 development of the appropriate connections to point data 110 and non-point data 112 may be accomplished through the of inclusion of multiple previously defined components/views. Thus the modeled approach 614 derives certain benefits from class-based structure and organization when high-level components/views may be represented through the use of lower-level components/views with or without the inclusion of additional information as needed.

Figure 8:
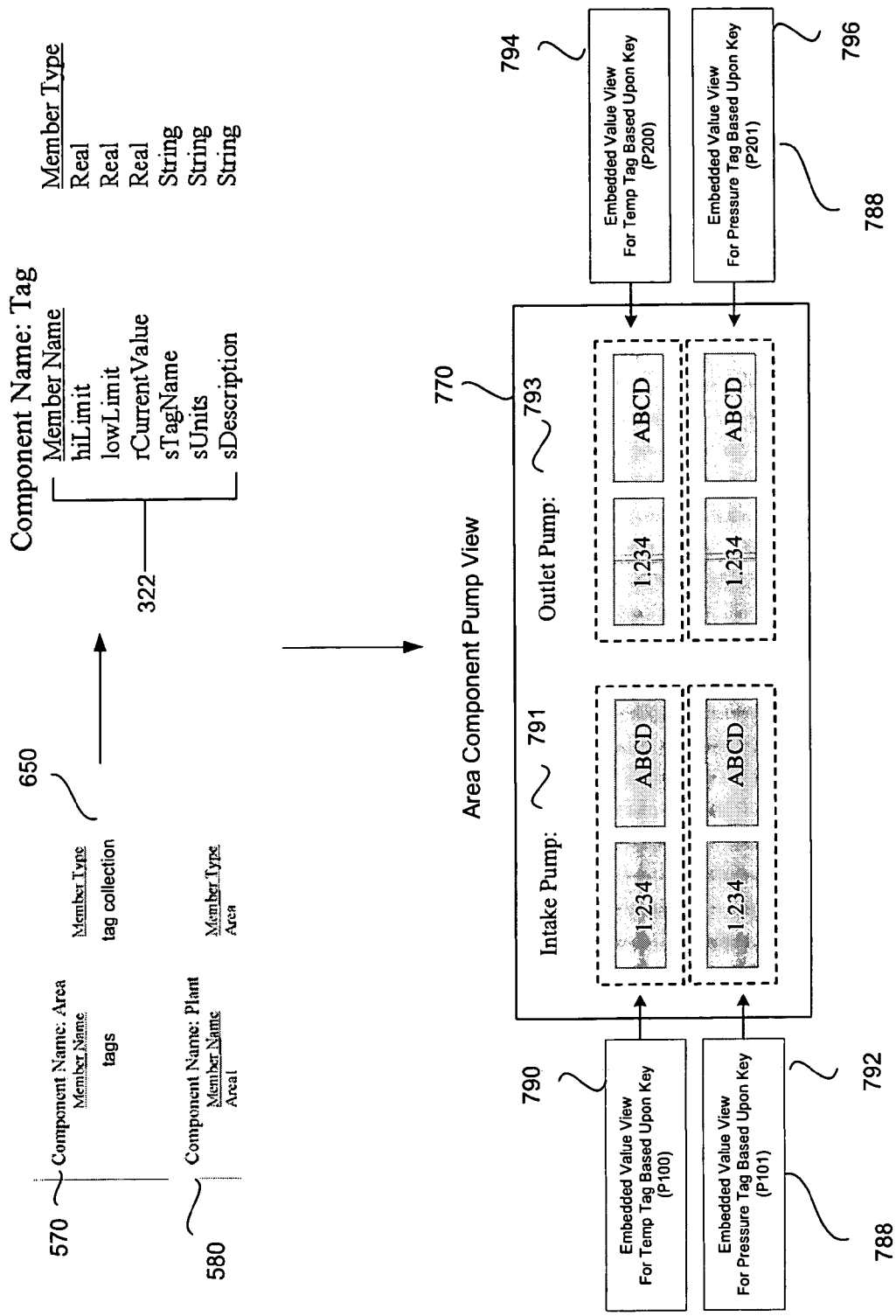
FIG. 8 illustrates an exemplary non-modeled approach to tag/component view definition.

FIG. 8 illustrates an exemplary application of the non-modeled approach 616 in the development of an analogous area pump component view 770 containing similar information and structure as that described in connection with the modeled approach 614 above. In the non-modeled approach 616, it is not necessary to adhere to a class-based organizational scheme and define low and intermediate level component and views. Thus, discretely defining individual lower level components such as the Pump members of the Area component is not necessarily required. Instead, a tag collection 650 may be used to define point data 110 and non-point data 112 relations for the Area component 570. In one aspect, use of the tag collection 650 enables all of the tags 305 and the tags' component members 322 to be made available to the Area component 570. Tag component members 322 used in the tag collection 650 may be substantially unique to the Area component 570 itself or used throughout the entire Plant 580. When used in the context of the Area component 570 alone it will be appreciated by those skilled in the art of database filtering techniques that an appropriate filter can be devised for the Area component instances that limit the availability of tags for use in the Area component 570 accordingly. Additionally, it will be appreciated that various database selection techniques may be implemented for appropriate selection of desired records/items within the tag collection or record set.

In the non-modeled approach 616, the "association" of embedded views for selected tags/components to a "record" in the tag collection may constitute forming an appropriate "connection" similar to that described above to route the desired data to the appropriate tag/component display. For example, embedding the tag component's value view for the pump's temperature tag may comprise selecting the correct tag/component by specifying the tags collection 650 and "selecting" the individual tag 305 by specifying a key/unique identifier 788 within the point data table 406 or non-point data table 405 shown in FIG. 4A-D. For example, acquisition of appropriate temperature point data 110 and non-point data 112 associated with an embedded value view 790 of the intake pump 791 may be obtained through the tag reference 790 corresponding to "P100" in the joined data table 494 shown in FIG. 4D. Similarly, the tag reference 788 corresponding to "P101" in the joined data table 494 may be used to configure connections to acquire appropriate pressure point data 110 and non-point data 112 for the embedded value view 792. The outlet pump 793 may be similarly configured with analogous embedded value views 794, 796 corresponding to temperature and pressure point data 110 and non-point data 112 (tags and key references for the exemplary outlet pump not shown in FIGS. 4A-D).

Therefore, in the case of the non-modeled approach 616 to the development of the area component pump overview 770, the number of "configurations" used to achieve a similar result as the modeled example may be less (e.g. 4 in the illustrated example). From the foregoing, it will be appreciated that the non-modeled approach 616 therefore may be desirably implemented in various situations and require fewer connections/less labor as compared to the modeled approach 614. In such instances, certain aspects of the class-based organization of components/views may be preserved while others forgone as compared to the modeled approach 614.

Figure 9:
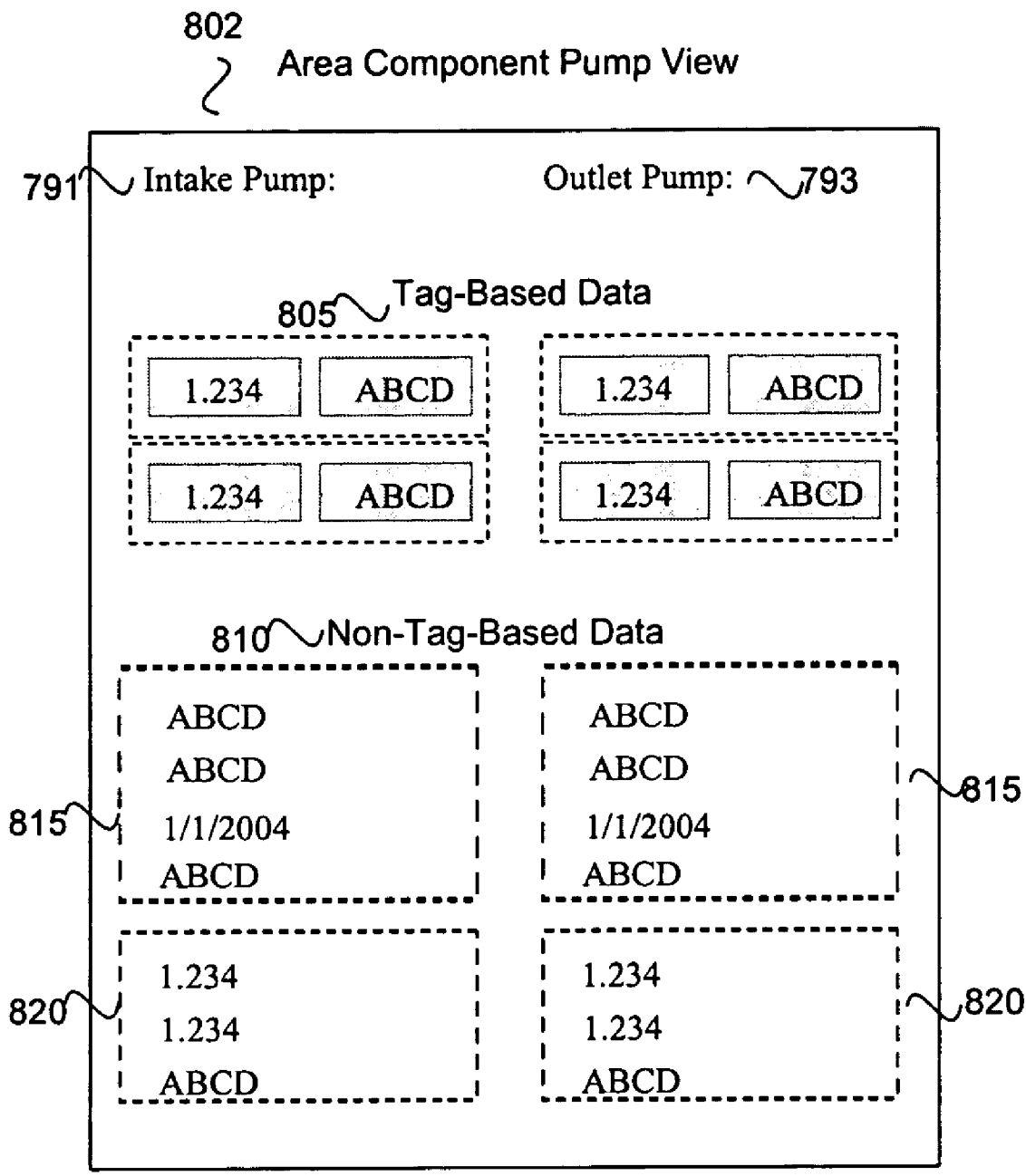
FIG. 9 illustrates an exemplary tag/component view definition for a tag-based and non-tag-based information.

FIG. 9 illustrates an exemplary area component pump view 802 that integrates tag-based data 805 and non-tag based data 810. In one aspect, this exemplary view 802 may be configured to contain similar information and structure as that described in connection with FIG. 8 above further extended by selected non-tag-based non-point data such as workorder information 815 and/or personnel information 820. Various selected portions of the non-tag-based non-point data may be presented in the view 802 along with the tag-based point data and non-point data providing a multitude of difference arrangements and configurations of data presentation. It will be appreciated that accessing and integration of the non-tag-based data 810 may be accomplished in a similar manner as that described for tag-based data acquisition/presentation using for example the component definitions described in connection with FIG. 5C. Both the modeled and non-modeled approaches 614, 616 may be used in "view" development with the corresponding advantages of each method. As with other exemplary views it will be appreciated that the illustrated view is not meant as limiting upon the scope of the present teachings but instead depicts selected benefits and possibilities of the integrated informational management approaches.

Collectively, the present teachings significantly enhance/extend the functionality and capabilities of conventional tag-based and non-tag-based data acquisition/management/development systems providing features that have been otherwise unavailable due to limitations in manipulating tag-based and non-tag-based data as well as point and non-point data. Although the foregoing description has shown, described and pointed out novel features of the invention, it will be understood that various omissions, substitutions, and changes in the form of the detail of the apparatus as illustrated, as well as the uses thereof, may be made by those skilled in the art without departing from the spirit of the invention.

What is claimed is:

1. A system for developing computer models for collection and display of data, the system comprising:

a component builder, executed by a processing device, configured to create a first reusable component definition, the first reusable component definition including at least one component associated with point data and non-point data associated with at least one back-end data source, the point data including data collected from at least one addressable informational source and the non-point data including context-defining data associated with the point data;

a connection for defining a mechanism to utilize the non-point data and other information to uniquely identify the data to be collected from the at least one addressable information source;

a module, executed by a processing device, utilizing said first reusable component definition to build another component definition for at least another component associated with second point data to be collected and second non-point data to be collected, the connection additionally defining a mechanism to utilize the second non-point data and other information to uniquely identify the second point data to be collected;

a view builder operable to generate a first reusable view that corresponds to the first reusable component definition generated by the component builder, wherein the first reusable view defines how the point data and non-point data are to be displayed, the view builder displaying the collected second point data and second non-point data in a view corresponding to the another component definition using a format defined by the first reusable view;

wherein the point data comprises operational data representative of at least one of: monitoring, control, and reporting functions, relating to operation of a selected back-end data source; and wherein the view builder provides functionality for inserting a view corresponding to a first component within a view corresponding to a second component such that third point data and third non-point data can be aggregated and displayed in a user-defined manner.

2. The system of claim 1 wherein, the component builder further provides functionality for defining and associating differential collection strategies for the point data and non-point data.

3. The system of claim 2 wherein, the component builder further provides functionality for aggregating the point data and non-point data from a plurality of addressable informational sources while maintaining the differential collection strategies for the point data and non-point data.

4. The system of claim 2 wherein, the differential collection strategies for the point data and non-point data differ with respect to frequency of collection.

5. The system of claim 4 wherein, collection of the point data generally occurs at a greater rate than collection of the non-point data.

6. The system of claim 2 wherein, the differential collection strategies for the point data and non-point data differ with respect to manner in which the point data and non-point data are collected.

7. The system of claim 6 wherein, the point data is collected based upon a publish-and-subscribe data collection approach.

8. The system of claim 6 wherein, the point data is collected as streaming data from the at least one addressable informational source of the back-end data source.

9. The system of claim 6 wherein, the non-point data is collected based upon a structured query approach.

10. The system of claim 6 wherein, the non-point data is collected via application programming interface (API) calls.

11. The system of claim 1 wherein, the point data reflects real-time values associated with the at least one addressable informational source of the at least one back-end data source.

12. The system of claim 11 wherein, the point data collected from the at least one addressable informational source is obtained at a substantially constant time interval to maintain up-to-date information to be displayed by the at least one component associated with the point data and non point data.

13. The system of claim 1 wherein, the non-point data is collected relatively infrequently while still maintaining up-to-date information to be displayed by the at least one component associated with the point data and non point data.

14. The system of claim 1 wherein, the non-point data comprises at least one of: relational, structural, attribute and documentational data.

15. The system of claim 1 wherein, the component builder provides functionality for generating a composite component that includes at least one previously generated component and wherein a solution builder provides an ability to selectively include at least a portion of the point data and non-point data from the previously generated at least one component within the composite component.

16. The system of claim 1 wherein, the module enables a user to specify a frequency with which the point data and non-point data are to be collected.

17. The system of claim 1 wherein, the module enables a user to separately specify, for each instance of a component, a frequency with which the point data and non-point data are to be collected.

18. A method of generating a computer model for collection and display of aggregated point data and non-point data, the method comprising:
creating a first reusable component definition, the first reusable component definition including at least one component associated with point data and non-point data;
collecting point data associated with the at least one component including data collected from at least one addressable informational source based upon a specified point data acquisition strategy;
collecting non-point data associated with the at least one component including context-defining data associated with the point data based upon a specified non-point data acquisition strategy, the non-point data and other information being used to uniquely identify the point data to be collected in the point data collecting step;
identifying at least one relationship associating the point data and non-point data;
configuring a first reusable aggregate view, corresponding to the first reusable component definition, for displaying the point data and non-point data;
utilizing the first reusable component definition to build another component definition including at least another component associated with second point data and second non-point data, the at least one relationship associating the point data and non-point data identified in the identifying step also being used to associate the second point data and second non-point data; and
displaying the second point data and second non-point data in a second view corresponding to the another component, the second view being configured according to the configuration of the first reusable aggregate view;
wherein a second reusable view component further identifies relationships associating the collected point data and non-point data and displays the point data and non-point data in a second aggregate view by including the first view component such that when a user accesses the second view to view data collected by the second view component, the first aggregate view is displayed within the second aggregate view; and
wherein the point data comprises operational data representative of at least one of: monitoring, control, and reporting functions, relating to operation of a selected back-end data source.

19. The method of claim 18 wherein, the second reusable component further collects additional point data and non-point data, said second reusable component including the at least one component as a member.

20. The method of claim 18 wherein, the specified point data acquisition strategy and the specified non-point data acquisition strategy differ with respect to the frequency with which the point data and non-point data are collected.

21. The method of claim 18 wherein, the specified point data acquisition strategy and the specified non-point data acquisition strategy differ with respect to the manner in which the point data and non-point data are collected.

22. The method of claim 21 wherein, the specified point data acquisition strategy is based upon a publish-and-subscribe data collection approach.

23. The method of claim 21 wherein, the specified point data acquisition strategy collects streaming data from the at least one addressable informational source.

24. The method of claim 21 wherein, the specified non-point data acquisition strategy is based upon a structured query approach.

25. The method of claim 21 wherein, the specified non-point data acquisition strategy collects data using application programming interface (API) calls.

26. The method of claim 18 wherein, the point data reflects real-time values associated with selected at least one addressable informational source of at least one back-end data source.

27. The method of claim 26 wherein, the point data collected from the at least one addressable informational source is obtained at a user-defined constant time interval to maintain up-to-date information.

28. The method of claim 18 wherein, the non-point data is collected relatively infrequently while still maintaining up-to-date information.

29. The method of claim 18 wherein, the non-point data comprises at least one of: relational, structural, attribute and documentational data.

30. An apparatus comprising a computer readable medium having instructions stored thereon to represent a collection of data from multiple sources and providing:
at least one instance of at least one base component, each instance of the at least one base component including point data comprising data collected from at least one addressable informational source and non-point data comprising context-defining data associated with the point data;
a connection for defining a mechanism to utilize the non-point data and other information to uniquely identify the data to be collected from the at least one addressable information source;
at least one instance of at least one extended component, each instance of the at least one extended component being generated using the at least one instance of the at least one base component, at least a portion of the point data and non-point data of the at least one base component being used to define the at least one extended component; and
a first reusable view specifying how data collected by the at least one instance of the at least one base component is to be displayed; said first reusable view additionally specifying how data collected by the at least one extended component is to be displayed in a second view corresponding to the at least one extended component; and a second reusable view including as a component at least a portion of the first view wherein the second view displays data collected by instances of the at least one base component and the at least one extended component in a display area corresponding to the first view;

wherein the point data and non-point data of the at least one base component are used to model a first business element;

wherein the extended component models a second business element of which the first business element is a logical subunit; and wherein the base component represents a tag having component members defined thorough the at least one relationship associating the point data and non-point data.

31. The apparatus of claim 30 wherein, the first business element comprises an item selected from the group consisting of: machinery, equipment, and production.

32. The apparatus of claim 31 wherein, the second business element is selected from the group consisting of: a plant, facility, and factory.

33. The apparatus of claim 30 wherein, differential collection strategies are used in the collection of the point data and the non-point data.

34. The apparatus of claim 33 wherein, the differential collection strategies for the point data and non-point data differ with respect to frequency of collection.

35. The apparatus of claim 30 wherein, the tag represents a logical collection of point data and non-point data associated with at least one of a selected instrument, operation, function, view and business element.

36. A system for developing computer models for collection and display of data, the system comprising:

a component builder, executed by a processing device, configured to generate a first reusable component definition for collecting first tag-based point data and first non-point data associated with at least one back-end data source, wherein the first tag-based point data comprises data collected from at least one addressable informational source and the first non- point data comprises context-defining data associated with the first tag-based point data;

the component builder further operable to collect second non-point data associated with a non-tag-based informational source;

a connection for defining a mechanism to utilize the first non-point data and other information to uniquely identify the first tag-based point data to be collected from the at least one addressable information source;

a module, executed by a processing device, utilizing said first reusable component definition to build another component definition for collecting second tag-based point data and third non-point data associated with at least one back-end data source, the connection additionally defining a mechanism to utilize the third non-point data and other information to uniquely identify the second tag-based point data to be collected;

a view builder operable to generate a first reusable view corresponding to said first reusable component definition generated by the component builder, whereby a user can generate at least one view that specifies how the second tag-based point data and third non-point data collected by said another component definition are to be displayed;

wherein the first tag-based point data comprises operational data representative of at least one of: monitoring, control, and reporting functions, relating to operation of a selected back-end data source; and wherein the view builder provides functionality for inserting a view corresponding to a first component within a view corresponding to a second component such that point data and non-point data can be aggregated and displayed in a user-defined manner.

37. The system of claim 36 wherein, the component builder further provides functionality for defining and associating differential collection strategies for the first tag-based point data and the first non-point data.

38. The system of claim 37 wherein, the component builder further provides functionality for aggregating point data and non-point data from a plurality of addressable informational sources while maintaining the differential collection strategies for the first tag-based point data and the first non-point data.

39. The system of claim 38 wherein, the differential collection strategies for the first tag-based point data and the first non-point data differ with respect to frequency of collection.

40. The system of claim 39 wherein, collection of the first tag-based point data generally occurs at a greater rate than collection of the first non-point data.

41. The system of claim 40 wherein, the differential collection strategies for the first tag-based point data and the first non-point data differ with respect to manner in which the point data and non-point data are collected.

42. The system of claim 1 wherein, the second point data comprises operational data representative of at least one of: monitoring, control, and reporting functions, relating to operation of a selected back-end data source.

43. The method of claim 18 wherein, the second point data comprises operational data representative of at least one of: monitoring, control, and reporting functions, relating to operation of a selected back-end data source.

44. The system of claim 36 wherein, the second tag-based point data comprises operational data representative of at least one of: monitoring, control, and reporting functions, relating to operation of a selected back-end data source.

* * * * *